US008662067B2

(12) United States Patent
Warner

(10) Patent No.: US 8,662,067 B2
(45) Date of Patent: Mar. 4, 2014

(54) HIGH SPEED SOLID COOKING FUEL IGNITER

(76) Inventor: Jon A. Warner, Santa Barbara, CA (US)

( * ) Notice: Subject to any disclaimer, the term of this patent is extended or adjusted under 35 U.S.C. 154(b) by 0 days.

(21) Appl. No.: 12/986,395

(22) Filed: Jan. 7, 2011

(65) Prior Publication Data
US 2011/0168157 A1  Jul. 14, 2011

Related U.S. Application Data

(63) Continuation of application No. 12/077,738, filed on Mar. 19, 2008, now Pat. No. 7,866,311.

(60) Provisional application No. 60/965,093, filed on Aug. 16, 2007, provisional application No. 60/895,682, filed on Mar. 19, 2007.

(51) Int. Cl.
F24B 1/19 (2006.01)

(52) U.S. Cl.
USPC .................. 126/25 B; 126/25 R; 126/29

(58) Field of Classification Search
USPC .......................... 126/25 B, 25 R, 29
See application file for complete search history.

(56) References Cited

U.S. PATENT DOCUMENTS

| | | | | |
|---|---|---|---|---|
| 1,614,785 A | * | 1/1927 | Fraser | 126/38 |
| 2,780,218 A | * | 2/1957 | Allen | 126/110 B |
| 2,950,669 A | | 8/1960 | Terry | |
| 3,060,868 A | * | 10/1962 | MacLachlan | 126/25 B |
| 3,159,119 A | * | 12/1964 | Hottenroth et al. | 126/25 B |
| 3,167,040 A | * | 1/1965 | Byars, Sr. et al. | 126/25 B |
| 3,191,556 A | * | 6/1965 | Hottenroth et al. | 126/25 B |
| 3,209,712 A | * | 10/1965 | Arena | 126/25 B |
| 3,647,323 A | * | 3/1972 | Thomas | 417/234 |
| 3,697,198 A | * | 10/1972 | Holder, Jr. | 417/411 |
| 3,890,984 A | * | 6/1975 | Lesetar | 132/271 |
| 3,933,145 A | * | 1/1976 | Reich | 126/25 R |
| 3,974,821 A | * | 8/1976 | Storandt | 126/25 B |
| 3,982,522 A | | 9/1976 | Hottenroth et al. | |
| 4,023,553 A | * | 5/1977 | London et al. | 126/25 B |

(Continued)

FOREIGN PATENT DOCUMENTS

DE          20203340 U1  *  7/2003

OTHER PUBLICATIONS

English-language translation of German Patent No. DE 20203340 U1, Jul. 10, 2003.

Primary Examiner — Kenneth Rinehart
Assistant Examiner — Jorge Pereiro
(74) Attorney, Agent, or Firm — Dascenzo Intellectual Property Law, P.C.

(57) ABSTRACT

Devices and methods for accelerating the combustion of non-gas cooking fuels used in barbequing. The devices include a starting fuel for preparing, or starting, a cooking fuel, such as charcoal briquettes, for use to cook food. The starting fuel is contained in a kindling chamber beneath an upper chamber containing the cooking fuel. A powered air delivery mechanism may provide an airflow to the fuels to increase combustion and heating thereof. In some embodiments, the device is a breach-loading device. In some embodiments, the air delivery mechanism is battery-powered. The device may be configured to provide, and/or may be automated to provide, different operating states responsive to the degree of ignition and/or combustion of the fuels in the device. In some embodiments, the device is adapted to automatically be transitioned between forced-air and natural-draft operating states, which may be controlled responsive to sensed operating parameters of the device.

36 Claims, 7 Drawing Sheets

(56) References Cited

U.S. PATENT DOCUMENTS

| | | | |
|---|---|---|---|
| 4,190,034 A * | 2/1980 | Wonisch | 126/25 B |
| 4,227,510 A | 10/1980 | Frazier et al. | |
| 4,406,941 A * | 9/1983 | Schmerein, Jr. | 219/261 |
| 4,516,561 A * | 5/1985 | Stawski et al. | 126/25 B |
| 4,583,208 A | 4/1986 | Naylor | |
| 4,603,679 A | 8/1986 | Ogden | |
| 4,934,260 A * | 6/1990 | Blevins | 99/482 |
| 5,103,577 A * | 4/1992 | Michaels et al. | 34/91 |
| 5,105,797 A | 4/1992 | Gulutzen et al. | |
| 5,168,860 A * | 12/1992 | Kibourian | 126/25 R |
| 5,640,948 A | 6/1997 | Nitta et al. | |
| 5,812,061 A | 9/1998 | Simons | |
| 5,875,562 A * | 3/1999 | Fogarty | 34/97 |
| 6,009,867 A | 1/2000 | Walton | |
| 6,520,173 B2 | 2/2003 | Lautner | |
| 6,615,820 B1 * | 9/2003 | Ferreira et al. | 126/25 B |
| 7,028,416 B1 * | 4/2006 | Dobie et al. | 34/666 |
| 2005/0229918 A1 | 10/2005 | Shim | |
| 2006/0236995 A1 | 10/2006 | Chang | |
| 2007/0044784 A1 * | 3/2007 | Thompson | 126/25 B |
| 2007/0272229 A1 * | 11/2007 | Becker et al. | 126/25 B |
| 2009/0148801 A1 * | 6/2009 | Wedermann | 432/14 |
| 2009/0165769 A1 * | 7/2009 | Van Der Sluis | 126/15 A |

* cited by examiner

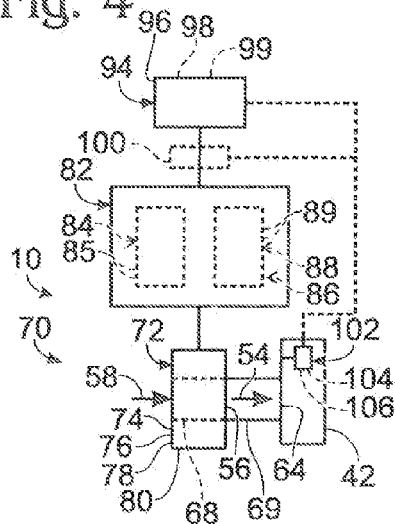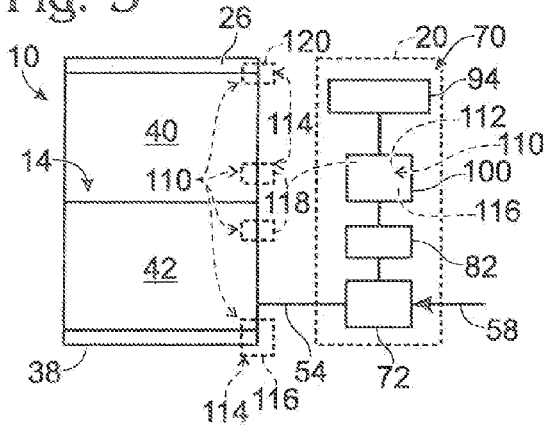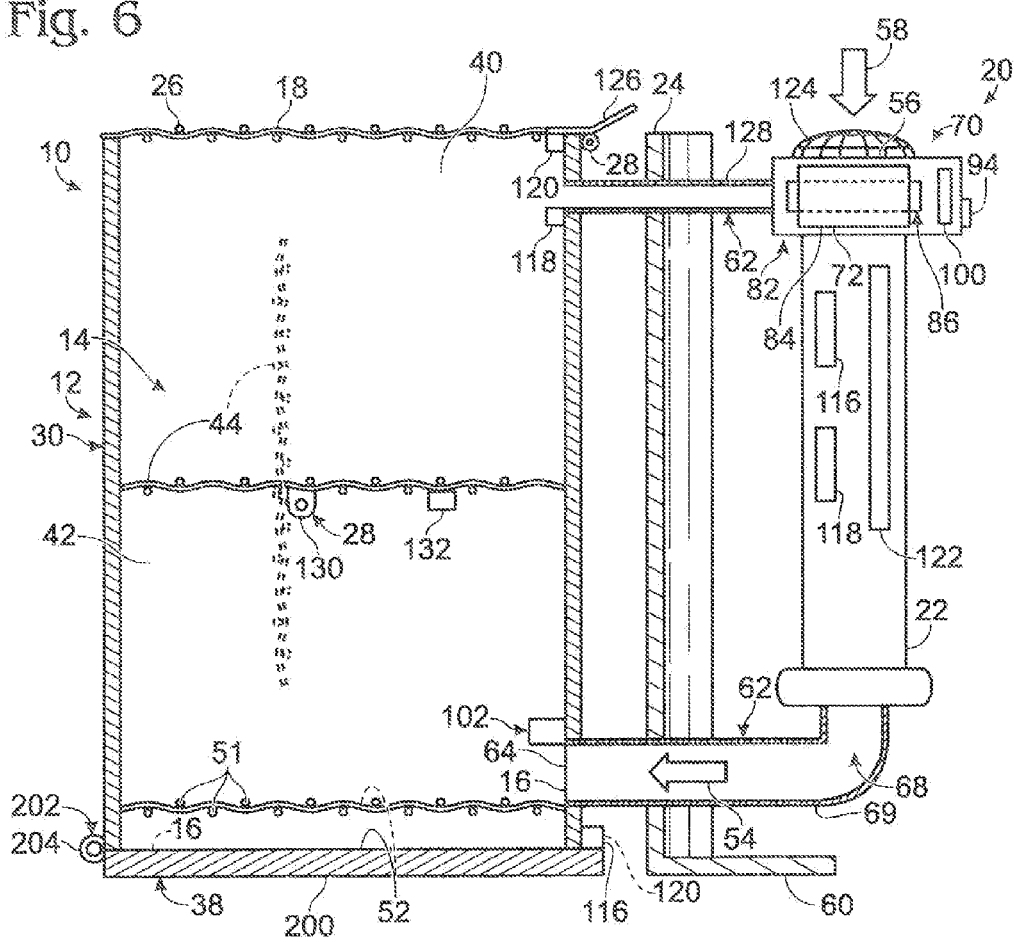

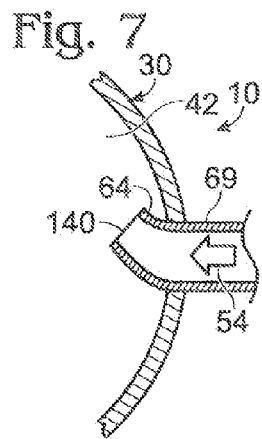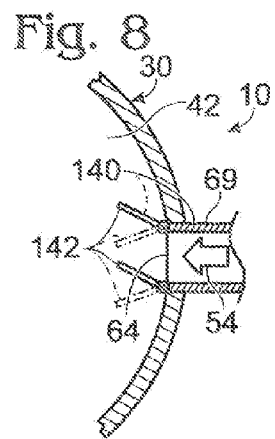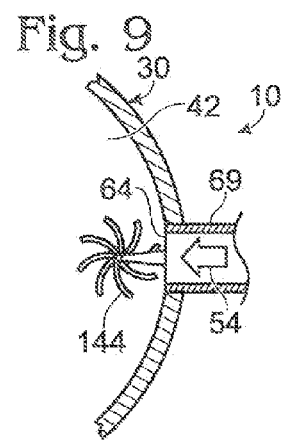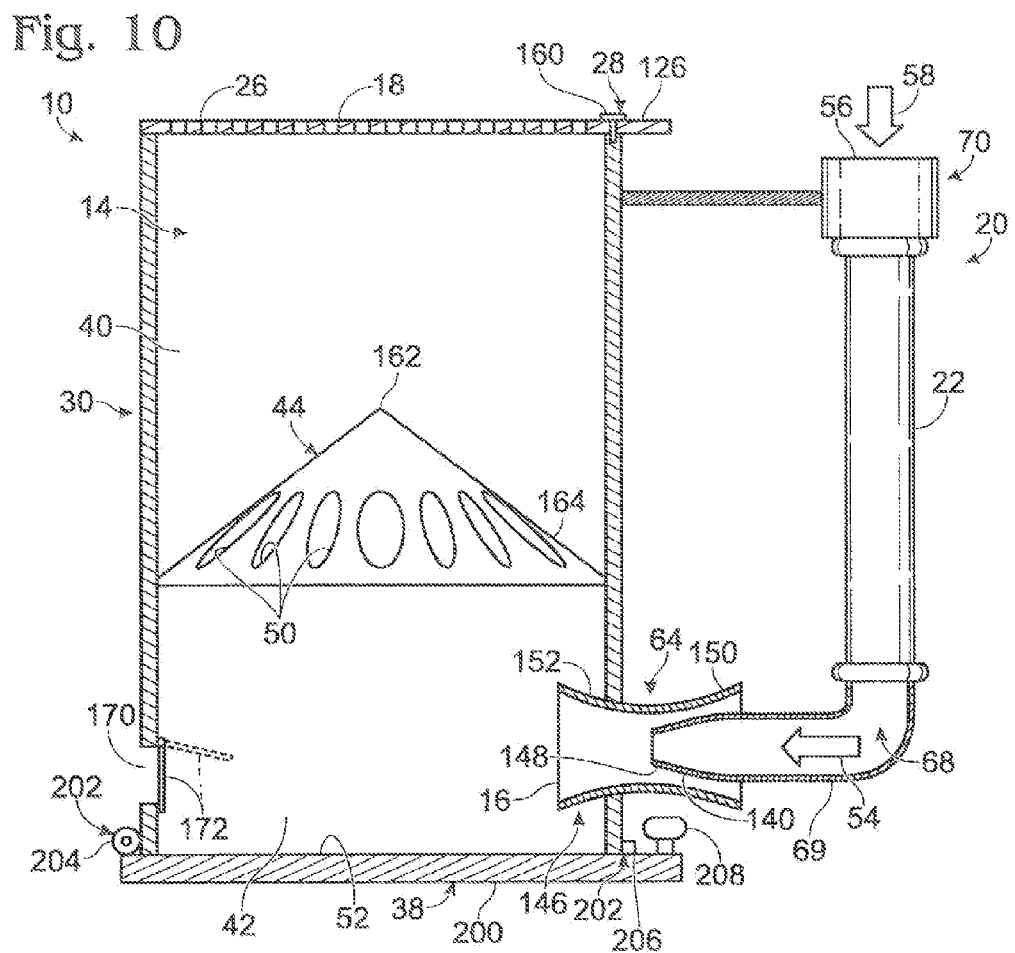

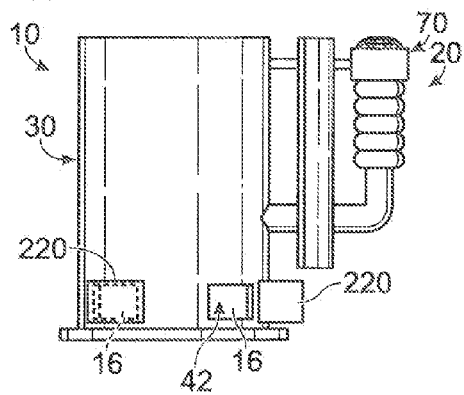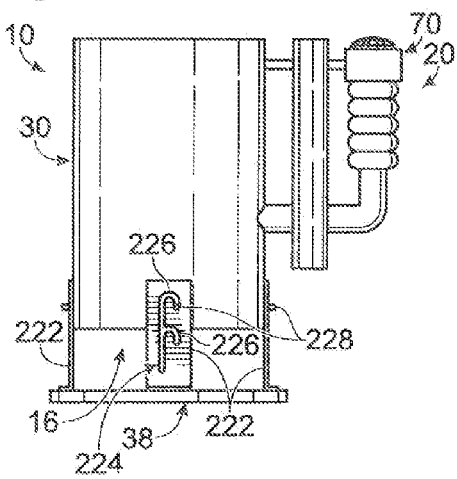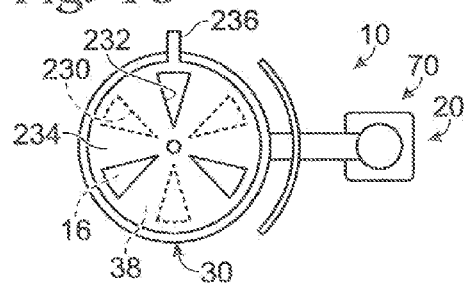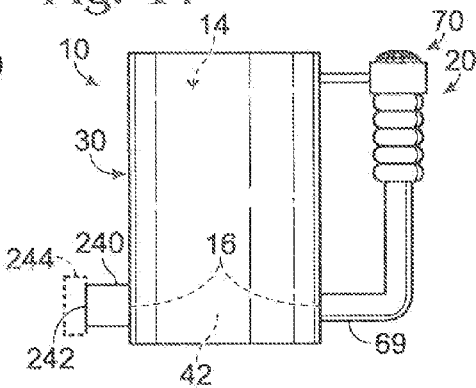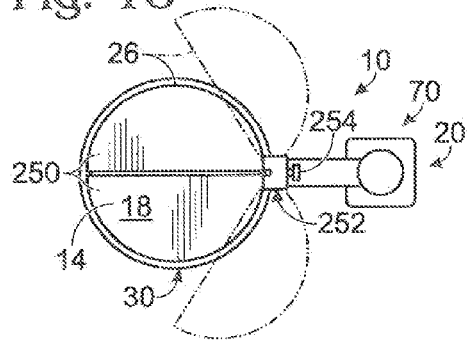

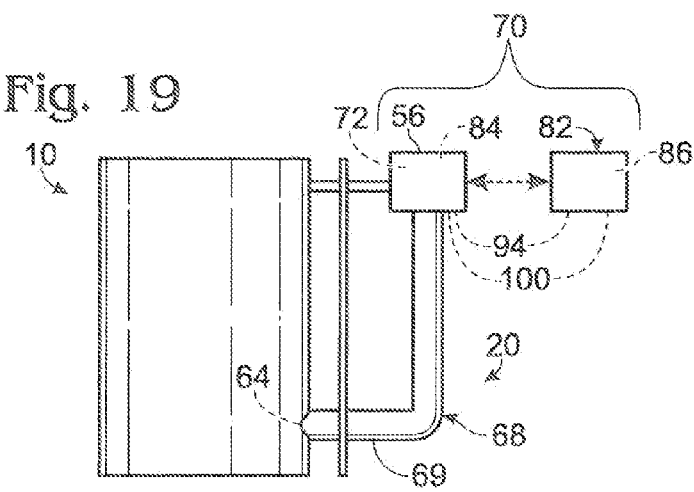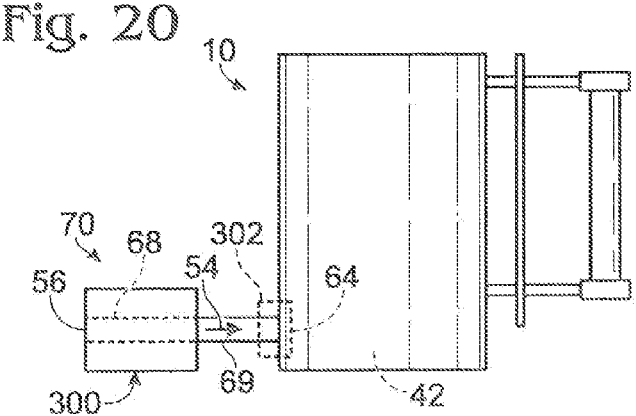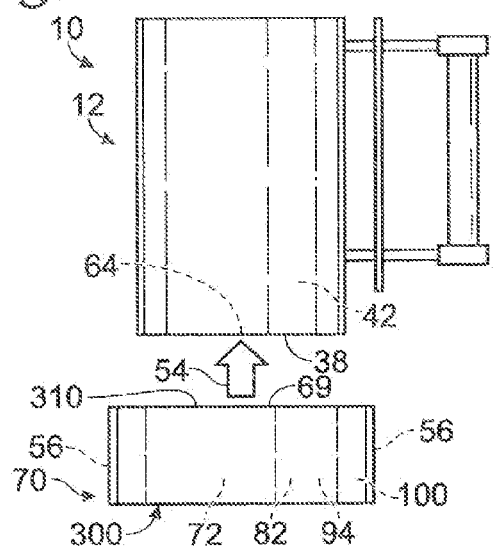

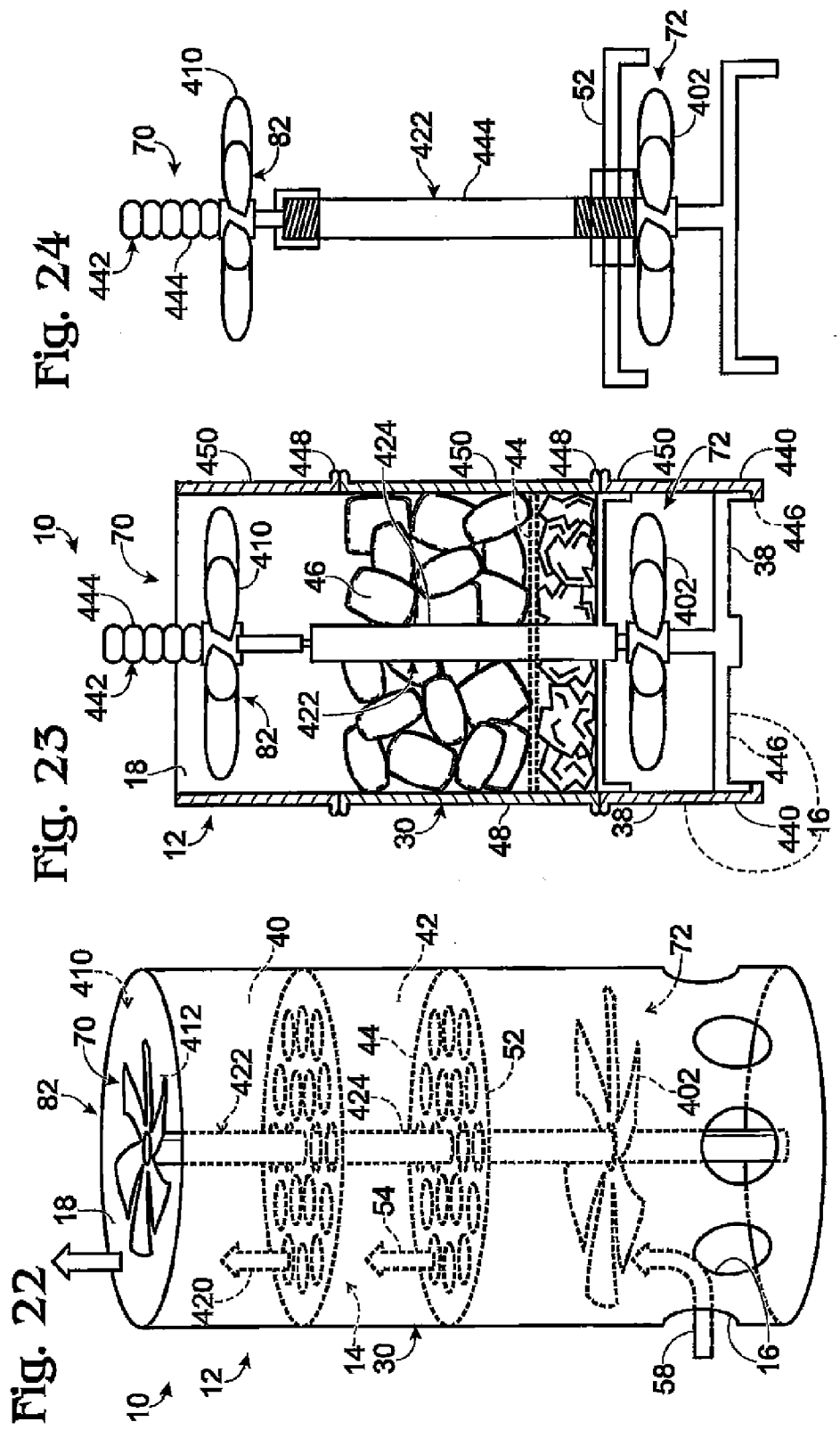

HIGH SPEED SOLID COOKING FUEL IGNITER

RELATED APPLICATIONS

The present application claims priority to U.S. Non-Provisional patent application Ser. No. 12/077,738, which was filed on Mar. 19, 2008, and which issued as U.S. Pat. No. 7,866,311 on Jan. 11, 2011, and which claimed priority to U.S. Provisional Patent Application Ser. No. 60/895,682, which was filed on Mar. 19, 2007, and U.S. Provisional Patent Application Ser. No. 60/965,093, which was filed on Aug. 16, 2007. The complete disclosures of the above-identified applications are hereby incorporated by reference.

FIELD OF THE DISCLOSURE

The present disclosure is directed generally to igniters for use in lighting cooking fuels for barbeques and similar structures, and more particularly to devices which speed or otherwise assist the process of lighting or otherwise preparing these fuels for use to cook food.

BACKGROUND OF THE DISCLOSURE

It is a popular activity to cook foods over a charcoal grill, but certain drawbacks to this process have led to the development of various gas fired barbeque products that mimic the effects of charcoal grilling. In general, these devices lack the ability to impart a natural wood smoke flavor to the items being grilled. It is possible to add wood chips to such grills, but this is seldom done and is in some cases awkward.

Many people still prefer to cook over true charcoal/wood fires, but this activity is often avoided due to the time required to get coals up to a proper state of combustion. At sea level, this starting process typically requires at least thirty minutes using natural combustion products, without hydrocarbon starting fluids, and a chimney lighter, a common and often-used lighting device. An illustrative example of a chimney lighter is disclosed in U.S. Pat. No. 3,167,040, the complete disclosure of which is hereby incorporated by reference. The problem of charcoal/wood ignition is greatly increased as one travels to higher altitudes, where the concentration of oxygen decreases with height above sea level. At seven thousand feet altitude, it typically requires an hour or more to start a charcoal briquette barbeque using a conventional chimney lighter device. The addition of various liquid hydrocarbon fuels to the charcoal will speed the process. However, these hydrocarbon fuels may impart a chemical flavor to the foods being cooked and/or otherwise expose the foods to chemical byproducts associated with the hydrocarbon fuels. As such, many choose not to use such liquid and other forms of hydrocarbon additives.

SUMMARY OF THE DISCLOSURE

The present disclosure is directed to systems and methods for rapidly igniting solid fuel for use in cooking, or other applications, by using a forced air system. The systems and methods involve a device that is used to prepare, or start, charcoal and/or other wood-based fuels for use in a barbeque or similar structure for cooking food. The device, systems, and methods may involve various structures working together to provide desirable, and different, conditions at various stages of ignition. The device includes a housing with a vertical column, or internal compartment, which is divided into two chambers, much like a conventional chimney lighter. The upper chamber holds the cooking fuel, which may take the form of charcoal briquettes. This chamber has a perforated or otherwise air-permeable bottom, or partition, that separates this chamber and any fuel contained therein from a lower kindling chamber, or plenum, beneath the upper chamber. The perforated bottom of the upper chamber permits hot gases, and in some embodiments flames, from the burning starting fuel in the kindling chamber to pass through the perforations to ignite the cooking fuel in the upper chamber.

The device may include an air delivery mechanism, which in some embodiments is a powered air delivery mechanism and/or which is a pressurized air delivery mechanism. The air delivery mechanism positively delivers an airflow to the kindling chamber via at least one air delivery conduit. The airflow provides air at a greater flow rate and/or pressure than would otherwise be provided by natural drafting of air through openings in the igniter's housing. In some embodiments, the air delivery mechanism includes a fan, blower, or compressor, and in some embodiments, the air delivery mechanism is a battery-powered air delivery mechanism.

In some embodiments, the device includes a closure mechanism, which in some embodiments is a breach-loading closure mechanism. The closure mechanism provides selective access to the kindling chamber for loading kindling, paper, or other starting fuels into the kindling chamber. The closure may also provide a seal, when in a closed configuration, to permit and/or maintain the increased air velocity, flow rate, and/or pressure in the kindling chamber provided by the air delivery mechanism. In some embodiments, the closure is configured to permit selective adjustment of the airflow provided to the kindling chamber and/or to permit air from external the igniter to flow into the kindling chamber through an opening other than through the air delivery conduit(s) used to deliver the airflow from the air delivery mechanism.

BRIEF DESCRIPTION OF THE DRAWINGS

FIG. 4 is a schematic diagram of a suitable air delivery mechanism for igniters according to the present disclosure.

FIG. 5 is a schematic diagram of another suitable air delivery mechanism for igniters according to the present disclosure.

FIG. 6 is a partially schematic cross-sectional side elevation view of another igniter according to the present disclosure.

FIG. 7 is a fragmentary top cross-sectional view of a portion of an igniter according to the present disclosure.

FIG. 8 is a fragmentary top cross-sectional view of a portion of an igniter according to the present disclosure.

FIG. 9 is a fragmentary top cross-sectional view of a portion of an igniter according to the present disclosure.

FIG. 10 is a partially schematic cross-sectional side elevation view of another igniter according to the present disclosure.

FIG. 14 is a side elevation view of another igniter according to the present disclosure.

FIG. 15 is a side elevation view of another igniter according to the present disclosure.

FIG. 16 is a bottom plan view of another igniter according to the present disclosure.

FIG. 17 is a partially schematic side elevation view of another igniter according to the present disclosure.

FIG. 18 is a partially schematic top plan view of another igniter according to the present disclosure.

FIG. 19 is a schematic side elevation view of another igniter according to the present disclosure.

FIG. 20 is a schematic side elevation view of another igniter according to the present disclosure.

FIG. 21 is a schematic side elevation view of another igniter according to the present disclosure.

FIG. 22 is a side elevation view of another igniter according to the present disclosure.

FIG. 23 is a side elevation view of another igniter according to the present disclosure.

FIG. 24 is a side elevation view of a portion of the igniter of FIG. 23.

DETAILED DESCRIPTION AND BEST MODE OF THE DISCLOSURE

Figure 1:
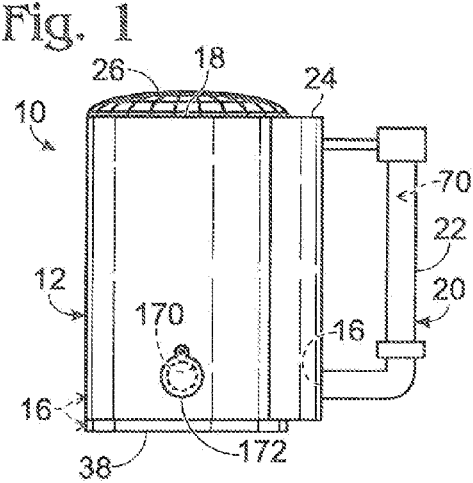
FIG. 1 is a side elevation view of an igniter according to the present disclosure.
Figure 2:
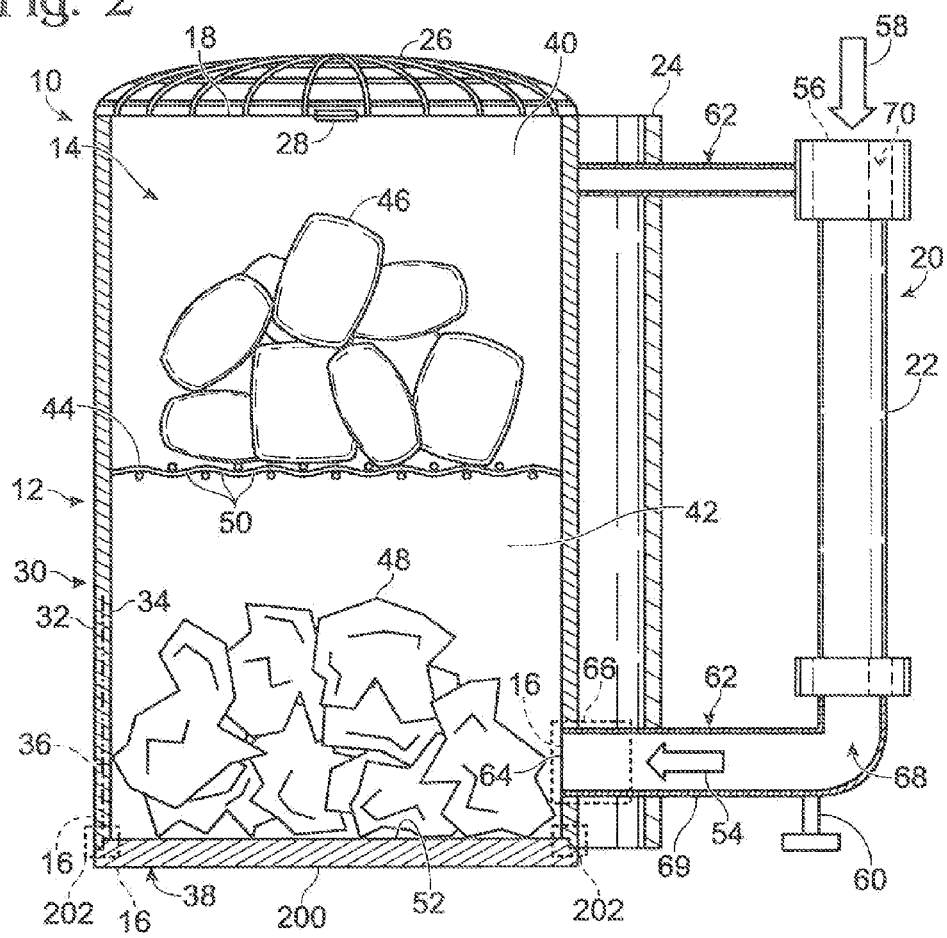
FIG. 2 is a partial cross-sectional, partial fragmentary view of the igniter of FIG. 1.

An illustrative, non-exclusive example of an igniter according to the present disclosure is shown in FIGS. 1 and 2 and generally indicated at 10. Igniter is designed to prepare charcoal, wood, or other combustible fuels for use in barbequing food. Igniter 10 may be referred to herein as a chimney starter or charcoal starter.

Igniter 10 is designed to "start" charcoal, wood, or a similar barbequing fuel prior to the fuel's use to cook food, typically after removal of the fuel from the igniter and placement of the fuel in a barbeque or similar structure for cooking food. As used herein, "starting" of a barbequing fuel refers to igniting and partially combusting the fuel prior to use of the fuels to barbeque food. As used herein, "barbequing" refers to using partially combusted charcoal, wood, or other coals to cook food, typically via indirect heating and hot gases emitted from the fuel. Barbequing typically occurs in outdoor environments and typically is a slower cooking process than grilling or broiling, in which food is typically placed near hotter direct heat sources, such as open flames. As such, a necessary step to barbeque foods is to prepare the charcoal, wood, or other barbequing fuel so that it is radiating or otherwise emitting a desirable amount of heat, such as in the illustrative, non-exclusive range of 200-400° F., without being too hot.

As shown in FIGS. 1 and 2, igniter 10 has a body 12 that defines an internal compartment, or interior compartment, 14 with at least one inlet 16 through which air is delivered to the internal compartment and at least one outlet 18 through which gases may exit, or be emitted from, the internal compartment. Inlet 16 is indicated in dashed lines in FIGS. 1 and 2 to schematically represent that the number and position of the one or more inlets 16 of an igniter 10 may vary without departing from the scope of the present disclosure. Igniters 10 according to the present disclosure may further include an air delivery mechanism 70 that is adapted to selectively positively provide a flow of air to the internal compartment of the body. As discussed in more detail herein, this flow of air may be referred to as a forced-air flow, as the air delivery mechanism, when actuated, mechanically draws the flow of air from external the body and propels the flow of air into the internal compartment. In the illustrative, non-exclusive example of an igniter 10 according to the present disclosure shown in FIGS. 1 and 2, air delivery mechanism 70 is housed in a handle 20 that extends from the body of the igniter. Handle 20 includes a grip, or handhold, 22 that is sized and shaped for grasping by a user, such as by at least partially enclosing the grip with the user's palm and fingers, when the user desires to move the igniter from place to place.

Also shown in FIGS. 1 and 2 are an optional heat shield 24 and an optional spark trap 26. Heat shield 24 is positioned in a spaced-apart relationship between the body and handle of the igniter. Heat shield 24 is designed to block or otherwise deflect heat radiating from the body of the igniter to reduce the transmission of this heat to the grip of the handle, and when grip 22 is being grasped by a user's hand, to the user's hand. Heat shield 24 may be formed from any suitable insulating or other material. Spark trap 26 extends across the outlet of the internal compartment and is configured to permit gases to be emitted from the internal compartment. However, spark trap 26 is also configured to provide a barrier or obstruction to restrict embers, sparks, and other particulate from being emitted from the internal compartment through the outlet, such as if carried by the emitted gases from the internal compartment. Illustrative, non-exclusive examples of suitable structures for spark trap 26 include one or more screens, grates, perforated surfaces, and the like.

Spark trap 26, when present, may be removably coupled to the igniter to permit selective movement of the spark trap from a spark-trapping position, in which it extends across the outlet to obstruct removal of the above-discussed embers, sparks, and other particulate, to an open position, in which the spark trap does not obstruct the passage of such particulate through the outlet. The open position of the spark trap may correspond to a position in which the spark trap is removed from contact with the body of the igniter, such as when the spark trap is a separate structure that is not physically tethered or otherwise coupled to the body of the igniter. Additionally or alternatively, the open position of the spark trap may correspond to a position in which the spark trap is sufficiently pivoted, slid, translated, or otherwise moved from its spark-trapping position to permit particulate to pass through the outlet. It is within the scope of the present disclosure that the open position of a spark trap may correspond to a position in which charcoal or other solid cooking fuels within the internal compartment of the igniter's body may be poured or otherwise removed from the internal compartment through the outlet.

Spark trap 26, when present, may be removably coupled to the igniter, such as to the body of the igniter, by one or more suitable coupling mechanisms, or coupling structures. An illustrative, non-exclusive example of such a coupling structure is indicated at 28 in FIG. 2. Illustrative, non-exclusive examples of such coupling mechanisms include frictional engagement between the spark trap and the body, a hinge or other repositionable linkage that interconnects the spark trap and the body of the igniter, and a pin or other retainer that couples the spark trap to the body for selective movement with a range of positions relative to the body.

As perhaps best seen in FIG. 2, body 12 includes a housing, or shell, 30 having an outer surface 32 and an inner surface 34. In the illustrated example, the inner and outer surfaces have generally opposed configurations, with the inner surface facing the internal compartment 14 of the igniter and the outer surface facing away from the internal compartment. In the illustrated example, inner surface 34 encircles, or forms a closed perimeter around, internal compartment 14, but this is not required to all embodiments. Shell 30 may be formed from one or more materials and/or layers of materials. As indicated in dashed lines in FIG. 2, shell 30 may optionally include an insulating layer 36 between the inner and outer surfaces. Insulating layer 36 may be an air- or gas-filled chamber separating the inner and outer surfaces. As another illustrative, non-exclusive example, the insulating layer may include a suitable solid insulating material. As also indicated in FIG. 2, body 12 may include a bottom region, or bottom, 38. Bottom region 38 may include an open passage, a solid surface, an air-permeable structure, or combinations thereof. Bottom region 38 may form a portion of the shell of the body, or it may be a separate structure. When bottom region 38 includes a solid structure or other physical structure that extends across the lower region of the shell, the bottom region may be referred to as a base 38.

Internal compartment 14 of the igniter includes an upper chamber 40 and a lower chamber 42 that are separated by an air-permeable partition 44. By "air permeable partition," it is meant to include a partition that is formed from an air-impermeable material with openings through which air may pass, a partition formed from a material through which air may pass (and which may optionally also include additional openings formed therein), and/or a partition that is mounted within the internal compartment to define passages or other openings between the partition and the inner surface of the housing through which air may pass. Upper chamber 40 may additionally or alternatively be referred to as a charcoal chamber, a cooking fuel chamber, and/or an upper compartment. Lower chamber 42 may additionally or alternatively be referred to as a kindling chamber, an air plenum, and/or a lower compartment. Upper chamber 40 is configured to receive a solid cooking fuel 46, and lower chamber 42 is configured to receive a starting fuel 48. Illustrative, non-exclusive examples of cooking fuels 46 include wood, charcoal, charcoal briquettes, lump charcoal, and mixtures thereof. Illustrative, non-exclusive examples of a starting fuel 48 include paper, kindling, sticks, pine cones, sawdust, combustible resins and waxes, and mixtures thereof. Typically, cooking fuel 46 will have a longer burning time than starting fuel 48, such as due to its inherent properties and/or due to the relative shape, mass, quantity, and/or configuration of the cooking and starting fuels. Starting fuel 48 will often be easier to ignite, such as with a match, than cooking fuel, such as due to its inherent properties and/or due to the relative shape, mass, quantity, and/or configuration of the cooking and starting fuels. Accordingly, starting fuel 48 will typically be selected to burn hot and long enough to ignite the cooking fuel and to assist in at least some of the initial combustion thereof. Cooking fuel 48 will typically be selected to burn for a sufficient period of time and at a sufficient temperature for use to barbeque food after being started by the starting fuel. As illustrated in FIG. 2, and as their relative names imply, upper chamber 40 is positioned sufficiently above lower chamber 42 so that burning kindling fuel 46 will ignite and start the cooking fuel.

In the illustrative, non-exclusive example of an igniter 10 shown in FIG. 2, partition 44 is shown spanning, or extending across, the internal compartment, and partition 44 includes a plurality of openings, vents, or passages, 50. Partition 44 is sized and shaped to support cooking fuel 46 above the lower chamber and to permit air, gas, and even flames from the lower chamber to pass through openings 50 to the upper chamber. Illustrative, non-exclusive examples of suitable structures for partition 44 include one or more screens, grates, perforated plates, series of spaced-apart rods or other members, lattices, and the like. While not required, partition 44 may be structurally thicker or stronger than spark trap 26 due to the partition's need to support the cooking fuel and/or due to partition 44 being positioned closer to the heat emitted by the starting fuel.

Igniters 10 according to the present disclosure may include, but are not required in all embodiments to include, support 52 for the starting fuel, as indicated in FIG. 2. When present, support 52 may be an air-permeable support that permits air from exterior the igniter to pass through the support to the lower chamber, or support 52 may cooperate with the body of the igniter to form a closure that restricts or even prevents air from external the igniter to flow into the lower chamber through or around the support. Support 52, when present, may be permanently secured to the shell or other portion of body 12 of the igniter, may be configured for repeated removal from and reattachment to the body of the igniter, or may be secured or otherwise coupled to a removable base for the igniter. Similarly, it is within the scope of the present disclosure that support 52, when present, may be retained in a fixed orientation relative to the shell of the igniter or that the support may be selectively positioned within a range of positions, which may include a position in which the support is not oriented to support starting fuel in an operative position for starting cooking fuel within the lower chamber and/or a position in which the support permits access to the lower chamber, such as to position starting fuel in the lower chamber.

In FIG. 2, handle 20 is shown being connected to the body of the igniter by a pair of arms, or linkages, 62 that interconnect and maintain a spaced-relationship between the handle's grip 22 with the body of the igniter. The particular configuration, size, and orientation of the linkages are not critical and may vary within the scope of the present disclosure to include a single linkage or more than two linkages. In embodiments of igniters 10 according to the present disclosure in which the air delivery mechanism 70 is partially or completely housed in handle 20, at least one of the linkages may include, or define, a portion of an air conduit 68 through which an airflow is delivered to an air injection port 64 through which the airflow passes to the internal compartment of the igniter, and more particularly, to lower chamber 42, by operation of the air delivery mechanism. In FIG. 2, one of linkages 62 is shown as defining an air outlet, or air outlet conduit, 69 through which the positive airflow 54 created by air delivery mechanism 70 travels to air injection port 64. In such an embodiment, the handle will also include, or define, at least one air inlet 56 through which air from external the igniter is drawn or otherwise propelled by the air delivery mechanism through the air injection port.

It is within the scope of the present disclosure that the air injection port 64, air outlet 69, other portion of handle 20, and/or other portion of air delivery mechanism 70 may be configured to restrict or prevent the passage of heat from lower chamber 42 to a sufficient extent to prevent damage of the handle, injury to a user, or damage to the air delivery mechanism. Illustrative, non-exclusive examples of such a thermal insulating structure, which is schematically indicated at 66 in FIG. 2, include one or more of the materials of construction of the air injection port, air outlet, handle, and/or associated components of the air delivery mechanism contained therein, the orientation and relative position of the air injection port, air outlet, handle, and/or associated components of the air delivery mechanism contained therein, insulation to restrict the passage of heat from lower chamber 42 to the handle and/or components of the air delivery mechanism contained therein, a one-way or other suitable valve to restrict the flow of heated air from the lower chamber to the handle and/or portion of the air delivery mechanism contained therein, etc.

In FIG. 2, the airflow provided by the air delivery mechanism is schematically illustrated at 54, and air from external the igniter that is drawn into an air inlet 56 is schematically illustrated at 58. In FIG. 2, handle 20 is also shown including an optional support, or stabilizer, 60 that extends generally downward from the rest of the handle. Stabilizer 60, when present, is adapted to support the handle on a surface upon which the igniter is placed. Stabilizer 60 may additionally or alternatively extend from, or form a portion of, the heat shield.

Figure 3:
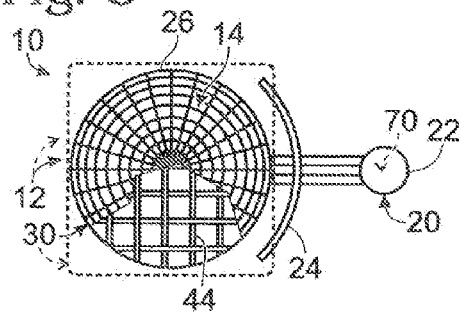
FIG. 3 is a partially schematic top plan view of an igniter according to the present disclosure.

Igniters 10 according to the present disclosure may have any suitable shape and size and may be constructed from any suitable materials for the applications and use described herein. In the illustrative, non-exclusive example of an igniter 10 shown in FIGS. 1 and 2, body 12 has a vertically oriented elongate configuration, which as shown in FIG. 3 may have a circular cross-sectional configuration. It is within the scope of the present disclosure that other shapes, sizes, and orientations may be used, including orientations in which the starting fuel chamber is not beneath the cooking fuel chamber so long as sufficient heat is able to pass between the chambers. Illustrative, non-exclusive examples of other cross-sectional shapes (when considered as a horizontal cut) include square, rectangular, regular or irregular polygonal, oval, elliptical, etc. This is schematically illustrated in FIG. 3 in dashed lines by the inclusion of a rectilinear cross-sectional configuration for body 12 and shell 30. The outer surface 32 of body 12 may be smooth. It may alternatively or additionally include topographic features such as ribbing, grooves, projections, protrusions, insulating material and/or structures, etc. Such features may be uniformly distributed over the surface of body 12, or may be arranged in a non-uniform pattern or distribution. As one example, igniter 10 may include ribbing or grooves extending generally spirally around body 12.

Body 12 may be constructed to different sizes and proportions, with the dimensions of approximately 5-10 inches in diameter or cross-sectional width and 10-24 inches high being suitable, but not exclusive, examples. More particular illustrative, non-exclusive examples include 7-8 inches in diameter or cross-sectional width, and 11-12 or 12-15 inches in height. As a further illustrative, non-exclusive example, body 12 may have a height-to-width ratio in the range of 1-2:1, including approximately 1.57:1. It is within the scope of the present disclosure that other lengths, widths, and/or length-to-width ratios may be used. The dimensions of a particular igniter may vary according to a variety of factors, including desired application, desired quantity of cooking fuel to be started herein, materials of construction, design preferences, manufacturing considerations, and the like. With consideration of the above, the upper chamber should be sized and configured to hold and provide for starting of a desired quantity of a selected cooking fuel, and the corresponding lower chamber should be sized and configured to hold a sufficient quantity of starting fuel in a suitable configuration for starting the cooking fuel in the upper chamber. The upper and lower chambers may be the same or different shapes, sizes, and/or dimensions without departing from the scope of the present disclosure.

Igniter 10, and especially body 12, partition 44, support 52 (when present), and spark trap 26 (when present) thereof, may be constructed from a wide variety of heat-tolerant materials, including materials that are structurally and chemically tolerant to the operating temperature and conditions to which the respective components are exposed during repeated use of the igniter. An illustrative, non-exclusive example of a suitable material is steel. In addition to having suitable chemical and thermal properties, this material is also relatively easily formed, which may be desirable from a manufacturing standpoint. Other illustrative, non-exclusive examples of suitable materials include stainless steel, ceramic, titanium, and other high temperature tolerant metals, concrete, stone, refractory fire cement, refractor insulating castables, zirconia insulating material, ceramic fiber, glass fiber and other minerals and mineral wool. It is within the scope of the present disclosure that body 12 may have a rigid, semi-rigid, or collapsible configuration. Body 12 may be formed via any suitable mechanism, including forming, rolling, molding, blow molding, injection molding, transfer molding, casting, and the like.

As discussed, igniters 10 according to the present disclosure include an air delivery mechanism 70 that is adapted to impart, or positively provide, airflow 54 to the lower chamber 42 of the igniter's internal compartment. This airflow promotes more rapid combustion of the starting fuel, and thus starting of the cooking fuel, than would normally be possible if the air delivery mechanism was not utilized. Accordingly, air delivery mechanism 70 may be described as providing a greater flow rate of air, per unit time, to lower compartment 42 than would otherwise pass through the lower compartment if the air delivery mechanism was not utilized and/or if air was only permitted to enter the lower chamber through natural draft mechanisms. This airflow may be provided at a greater velocity and/or pressure than air in the environment external the igniter.

As schematically represented in FIG. 4, air delivery mechanism 70 includes at least air propulsion source 72, drive assembly 82, and actuator 94. Air propulsion source 72 includes one or more devices that, when energized or otherwise actuated, create airflow 54, such as from air external the igniter that is drawn through an air inlet 56 into an air conduit 68 that extends through air injection port 64 to the lower chamber. Illustrative, non-exclusive examples of suitable air propulsion sources 72 include one or more of blower 74, fan 76, turbine 78, and/or compressor 80. Additional illustrative, non-exclusive examples of air propulsion sources 72 that may be utilized in an air delivery mechanism 70 for igniters 10 according to the present disclosure include one or more fans, piston pumps, centrifugal compressors, axial compressors, radial compressors, roots compressors, vain pumps, gear pumps, diaphragm pumps, peristaltic pumps, squirrel cage blowers and bellows pumps. In some embodiments, the air delivery mechanism may additionally or alternatively be referred to as an air propulsion mechanism and/or a compressor mechanism. It some embodiments, the air propulsion source may include a reservoir of compressed air or other gas, such as may be installed in a pre-charged condition or which may be charged with a supply of compressed gas by the air delivery mechanism. It is also within the scope of the present disclosure that other types of air-moving devices may be used in air delivery mechanism 70.

Air propulsion source 72, and/or operation thereof to positively generate airflow 54, is driven by a drive assembly 82, which may take any suitable form or structure to actuate the air propulsion source. As used herein, actuation of the air propulsion source refers to causing the air propulsion source to positively generate airflow 54, such as from air 58. By this it is meant that the actuation of the air propulsion source causes, results in, contributes to, or even entirely creates the airflow from air external the igniter. This positively generated air is not intended to include any air that enters the lower chamber through other passages or mechanisms, and the provision of airflow 54 by air delivery mechanism 70 is not intended to preclude that some amount of air may enter the lower chamber through other mechanisms or passageways and/or that this other air may contribute to the overall flow of air to the lower chamber. Actuation of the air propulsion source may additionally or alternatively be referred to as activation of the air propulsion source.

Illustrative, non-exclusive examples of suitable drive assemblies include electrically powered drive assemblies and manually powered drive assemblies. An electrically powered drive assembly, such as is indicated in dashed lines in FIG. 4, may include a motor assembly 84 that includes at least one motor 85 and an energy source 86 that is configured to energize, or power, the motor assembly. An illustrative, non-exclusive example of a suitable energy source 86 is a battery assembly 88, which may include at least one battery 89. Additional illustrative, non-exclusive examples include a rechargeable power supply, a single-use power supply, an AC line current from an electrical outlet, and a DC current from an automobile battery or other battery. An illustrative, non-exclusive example of a suitable manually powered drive assembly is a hand crank that a user grasps and manually revolves, such as via actuator 94, to actuate the propulsion device. In some embodiments, igniters 10 according to the present disclosure may be referred to as portable, hand-held, self-containing igniters in that they are sized for a user to transport the igniters by carrying the igniters by the handle and without requiring a connection to an external energy source, drive assembly, or other structure.

It is further within the scope of the present disclosure that the air delivery mechanism may include more than one type or kind of drive assembly, such as both an electrically powered drive assembly and a manually powered drive assembly. Such an embodiment permits a user to select between either of these drive assemblies. In situations in which the energy source for the electrically powered drive assembly was depleted or otherwise not available or desirable to use, the manually powered drive assembly could be used.

Actuator 94 refers to any device or mechanism that is utilized to initiate the actuation of the air propulsion source by the drive assembly. In many embodiments, the actuator may take the form of a user-manipulable device or structure 96. Responsive to the user performing some manipulation of the actuator, actuation of the air propulsion source by the drive assembly may be initiated, and in some embodiments terminated responsive to another manipulation of the same or a different actuator by the user. Illustrative, non-exclusive examples of suitable actuators include on/off switches, levers, movable cranks, electrical contacts or switches (such as push-button, rocker, momentary, slides, and the like), etc. As a further additional illustrative, non-exclusive example, when the air delivery mechanism includes an electrically powered drive assembly with a motor assembly, the actuator may take the form of an electrical switch or contact that selectively opens or closes a circuit for providing electrical power to the motor assembly from the energy source.

As discussed in more detail herein, and as schematically illustrated in FIG. 4 at 100, air delivery mechanisms 70 of igniters 10 according to the present disclosure may, but are not required to, include a controller. Controller 100 is adapted to control the operation of the air delivery mechanism responsive to at least one input. The control may be in the form of starting or stopping the actuation of the air delivery mechanism and may additionally include controlling or regulating the degree of actuation, such as by increasing or decreasing the actuation of the air propulsion source and thus regulating the magnitude (volumetric flow rate, velocity, pressure, etc.) of airflow 54 that is delivered to the lower chamber 42 of the igniter. When air delivery mechanism 70 includes or is in communication with a controller 100, the actuator 94 may include at least one user-manipulable device or structure 96 that functions as a user input device that generates an electrical signal to a controller. Responsive to receipt of this input signal(s) the controller automates or otherwise controls the actuation (such as initiating, stopping, adjusting, increasing, decreasing, etc.) of the air propulsion source by the motor assembly or other corresponding component of drive assembly 82.

FIG. 4 also schematically represents that igniters 10 that include an energy source 86, such as may be used to power a motor assembly 84 of an electrically powered drive assembly 82 for an air delivery mechanism 70, may also provide power, or an electrical output, to other components of the igniter. As an illustrative, non-exclusive example, FIG. 4 shows that igniters 10 according to the present disclosure may include an ignition device 102 in lower chamber 42. Ignition device 102 is adapted to be powered by the energy source and is designed to initiate combustion of the starting fuel in the lower chamber. Illustrative, non-exclusive examples of ignition devices include resistive heaters and spark plugs. When present, the ignition device may be actuated by the same or a different actuator 94 as the air delivery mechanism and/or may be controlled by controller 100 when a controller 100 is also present in a particular igniter. When present, ignition device 102 may prevent a user from needing to access the lower compartment to ignite the starting fuel and/or from needing to provide an access port in the igniter for a user to insert a match, lighter, or other flame source to initiate combustion of the starting fuel.

As yet another illustrative, non-exclusive example, an air delivery mechanism 70 that includes a manual drive assembly may include an actuator 94 in the form of a crank or handle 99 that a user manually rotates or otherwise moves to cause actuation of the air propulsion source. Actuator 94 may be positioned in any suitable location on igniter 10, with an illustrative, non-exclusive example being on or proximate handle 20 and/or on or proximate a portion of igniter 10 that contains at least a portion, if not all, of the drive assembly for a particular air delivery mechanism.

As discussed in connection with the illustrative, non-exclusive examples of igniters 10 shown in FIGS. 1-3, it is within the scope of the present disclosure that air delivery mechanism 70 may be housed in and/or form a portion of handle 20. In the previously described examples, the air propulsion source and drive assembly are housed within and/or form a portion of the handle, with air 58 being drawn into the handle to from an inlet 56 in the handle, and airflow 54 being propelled into the lower chamber of the igniter by the air delivery mechanism through an air conduit 68 that provides a fluid flow path, or conduit, from the air propulsion source to the lower chamber. In the depicted examples, the fluid flow path, or conduit extends through the handle from inlet 56 to air injection port 64 and then to lower chamber 42. The particular path and orientation of this air conduit is not critical and may vary within the scope of the present disclosure. It is within the scope of the present disclosure that different orientations and/or configurations of air delivery mechanism 70 may be utilized, including horizontal, radial, angular and curvilinear and adjustable orientations and/or removable blowers, fans and/or compressors.

Due to the efficient and rapid manner in which igniters according to the present disclosure may operate, it is also within the scope of the present disclosure for the igniters to optionally include one or more safety devices. As illustrative, non-exclusive examples, it is within the scope of the present disclosure that igniters 10 according to the present disclosure may fully prepare charcoal briquettes for use in a barbeque in less than 10 minutes, and in some embodiments in less than 5 minutes, or in less than 3 minutes, in 3-5 minutes, or in 3-8 minutes, from when combustion of the starting fuel is initiated. These illustrative examples are not intended to be exhaustive examples, and it is within the scope of the present disclosure that other times may be required by igniters within the scope of the present disclosure, including shorter and longer times. While not required to all embodiments, in experiments at sea level, starting, or preparation of a sufficient quantity of charcoal briquettes suitable for a standard size popular barbeque took approximately three minutes of actuation of the air delivery mechanism. At a seven thousand foot altitude, less than six minutes was required before the briquettes were ready for use to cook food in a barbeque.

When present, the safety devices may be self-contained devices or they may interact with other portions of the igniter, such as the air delivery mechanism and components thereof. When an igniter includes a controller 100, the controller may form a portion of, or be in communication with, one or more safety device. In FIG. 5, portions of an igniter 10 that include safety devices are shown, with the safety devices indicated generally at 110. Safety devices 110 may additionally or alternatively be referred to herein as safety mechanisms 110.

An illustrative, non-exclusive example of such a safety device or mechanism 110 is a timing device, or timer, 112 that is adapted to stop, interrupt, or reduce the magnitude of, airflow 54 provided by air delivery mechanism 70 after a predetermined or preselected time interval. Timer 112 may be positioned in any suitable location within the igniter and may be integrated into a controller 100 when an igniter includes such a controller. Timer 112 may be a mechanical device, an electrical device, or an electromechanical device. The time interval during which timer 112 permits actuation of the air delivery mechanism before stopping or otherwise interrupting operation thereof should be selected to be at least long enough to provide the desired accelerated combustion of the charcoal, wood, or other cooking fuel in upper compartment 44 of the igniter's internal compartment 14. In some embodiments, a time interval of approximately 5 minutes has proven effective, although others may be used, such as discussed above. Upon expiration of the preselected time period, timer 112 may automatically, alone or in combination with a controller 100, stop or at least substantially reduce the actuation of the air propulsion source.

Timer 112 may be utilized to prevent the overheating of the igniter and/or to prevent more than a desired, or acceptable, amount of combustion of the cooking fuel. When the time interval has expired, timer 112 may interrupt the operation of the air delivery mechanism via any suitable method, such as by opening an electrical circuit, preventing further actuation of the drive assembly, and the like. Timer 112 may also be configured to provide an audible alert, or alarm, to a user when the time interval has expired. Controller 100, when present, may additionally or alternatively include or be in communication with an alarm or similar device that is adapted to produce an audible alert to notify a user if any of the illustrative examples of a safety device 110 are actuated or otherwise detect an unsafe condition.

A further illustrative, non-exclusive example of an optional safety device or mechanism 110 that may be included in igniters 10 according to the present disclosure is a level detector, or tip switch, 116. Tip switch 116 is adapted to interrupt the operation of the air delivery mechanism if the igniter is tilted beyond a predetermined range, or predetermined angle, from a vertical orientation and/or if the igniter is inverted. Tip switch 116 may have any suitable constructions, including such illustrative examples as a tip switch that is entirely within igniter 10 and a tip switch that projects from the underside of igniter 10. As further illustrative examples, the tip switch may be include a depressible, or contact, portion that actuates the tip switch if not engaged by another surface, such as a surface upon which the igniter is supported, and/or may include a self-contained angle detector that is housed within the igniter, such as within handle 20, and detects the relative angle of the igniter.

Another illustrative, non-exclusive example of a suitable safety device or mechanism 110 is a device or mechanism that is adapted to interrupt the air flow or reduce the air flow provided by the air delivery mechanism if the temperature of a portion of the igniter exceeds a predetermined threshold temperature. Such a device or mechanism may be referred to as a temperature sensor and is schematically illustrated in FIG. 5 at 118. Temperature sensor 118 is configured to measure the temperature at a selected location or region of the igniter, and may include or be in communication with a controller that stops or otherwise interrupts or reduces the airflow provided by the air delivery mechanism should this threshold temperature be exceeded. Temperature sensor 118 may additionally or alternatively directly cause the actuation of air propulsion source 72 to be interrupted without requiring a separate controller. Temperature sensor 118 may have any suitable construction, with illustrative, non-exclusive examples including thermal switches, bimetallic sensors, thermally activated circuit breakers, and the like.

When a spark trap 26 is utilized, it is within the scope of the present disclosure (but not required to all embodiments) for the igniter to include a safety device 110 in the form of a closure sensor 120 that prevents powered operation of the air delivery mechanism when the spark trap is not in its closed position. Closure sensor 120 may communicate with a controller or may itself open a circuit that is required for the air delivery mechanism's air propulsion source to be actuated.

Additional illustrative, non-exclusive examples of optional safety devices or mechanisms 110 that may be utilized with igniters 10 according to the present disclosure include: 1) a safety device or mechanism 110 that is adapted to inject a fire extinguishing medium or use a process to diminish the combustion in and around the igniter when any of the above conditions occur or any conditions exceeding the normal operation of the igniter occur; and/or 2) a device or mechanism that prevents the igniter from operating when environmental conditions exist which would create an unsafe condition if the igniter were to be turned on, such as extreme wind, very low humidity, very high ambient temperatures, low oxygen, high carbon monoxide, carbon dioxide or any other dangerous gas concentrations including combustible gases such as natural gas, gasoline fumes or any combustible vapors and gasses, as well as any other unsafe condition where operation of the igniter would pose a danger to persons or property. The illustrative, non-exclusive examples of safety devices and mechanisms discussed above and illustrated in FIG. 5 may be used with any of the igniters that are disclosed, illustrated, and/or incorporated herein, and the devices or mechanisms may be used together or individually.

FIG. 6 provides a less-schematic illustrative example of another igniter 10 according to the present disclosure. In FIG. 6, a variety of optional safety devices and other optional features and structures are illustrated. It should be understood that the illustrated configurations and examples are not required or exclusive examples. Furthermore, while depicted together in FIG. 6, it is within the scope of the present disclosure that the depicted features, structures, and safety devices may be utilized and/or implemented together, separately, in different combinations, and/or with additional features, structures, and/or safety devices that are disclosed, illustrated, and/or incorporated herein. Furthermore, the features, structures, and safety devices described and/or illustrated with respect to the igniter 10 of FIG. 6 may be implemented and/or utilized with other igniters 10 according to the present disclosure, without departing from the scope of the present disclosure.

In FIG. 6, an air-permeable partition 124 is shown extending across the inlet 56 for air delivery mechanism 70. Partition 124 may be utilized to prevent a user's fingers or other body parts from being inserted into the inlet for the air delivery mechanism, as well as for preventing other objects like sticks, leaves, rocks, and the like from entering the air delivery mechanism and potentially causing damage thereto. Additionally or alternatively, the air delivery mechanism may utilize a plurality of sufficiently small inlets that the size and/or orientation of the inlets reduce the potential for entry of solid objects. In FIG. 6, the partition takes the form of an arcuate screen that projects from the handle and away from inlet 56. While the arcuate, or concave shape, of the screen or other partition is not required, it may function as a guard that prevents at least planar objects from obstructing the inlet and thus preventing air 58 from being drawn into the air delivery mechanism to form airflow 54.

FIG. 6 also demonstrates that an igniter 10 with a spark trap 26 may include a spark trap with a handle 126. Handle 126 projects from the spark trap to provide a lever by which a user may apply force to configure the spark trap between a closed position, in which it obstructs passage of embers and other solids from outlet 18 of the igniter's internal compartment 14, and an open position, in which cooking fuel and other solids may pass through outlet 18. In the depicted example, the spark trap handle projects at an angle away from outlet 18, and spark trap 26 is pivotally coupled to housing 30 of the igniter's body 12 by a coupling mechanism 28. Also shown in FIG. 6 is a heat shield 24 that also includes a projecting support 60 that is positioned to support and/or stabilize the igniter on a surface upon which it is rested.

In FIG. 6, schematic illustrative, non-exclusive examples of suitable positions for many of the previously described safety devices 110 are shown. For example, the igniter 10 of FIG. 6 includes several illustrative placements for a temperature sensor 118, for a tip switch 116, for a closure sensor 120, for spark trap 26, and optionally for base 52, and an optional dispenser for a fire extinguishing medium 122. In the non-exclusive example shown in FIG. 6, one of the linkages 62 of handle 20 is hollow and may be used as a race, or conduit, 128 for wires, such as may be utilized to connect various sensors or other safety devices 110, ignition device 102, and the like with a controller 100 or other portions of the air delivery mechanism.

FIG. 6 provides another illustrative, non-exclusive example of a suitable configuration for partition 44, which as discussed, is configured to support a cooking fuel above the starting fuel in the lower chamber so that heated combustion gases and/or flames from the combusting starting fuel may pass through the openings in the partition to ignite and start the cooking fuel to prepare the cooking fuel for use to barbeque food. In FIG. 6, partition 44 is pivotally coupled to the housing 30 of the igniter to permit the partition to be selectively configured between a closed position, which is shown in solid lines, and a retracted position, which is shown in dashed lines. In the closed position, which may also be referred to as a fuel-supporting position, the partition extends across at least a substantial portion of the internal compartment 14 of the igniter's housing 30 to divide the internal compartment into the upper and lower chambers and to provide a support for cooking fuel above the lower compartment. In the retracted position, the partition is sufficiently moved from the closed position to permit access to the lower chamber by a user's hand and/or to permit starting fuel to be inserted into the lower compartment through outlet 18.

In the illustrative example shown in FIG. 6, partition 44 is pivotally coupled to a coupling mechanism 28 in the form of a pin, rod, axle, or similar structure 130 that provides a support about which the partition may be pivoted. The location of the pin within the internal compartment may vary, such as due to the size and shape of the internal compartment, the size and shape of the partition, the degree to which the partition does or does not correspond to the size and shape of the internal compartment, the degree to which the partition is flexible or resilient, etc. Also shown is a stop 132 that supports at least a portion of the partition when the partition is in the closed position. Stop 132 should be designed to support the portion and the weight of cooking fuel that is placed on the partition. More than one stop 132 may be utilized, such as in a spaced-apart relationship extending from the internal surface of the housing of the igniter.

In FIGS. 2 and 6, air outlet 69 has been depicted as a tubular duct that is configured to direct airflow 54 into air injection port 64, where it then flows into the lower chamber and then upward toward the starting fuel in the upper chamber. This positive increase in the amount of oxygen provided to the fuels in the chambers, as compared to when oxygen is only provided via natural flow of air through air ports or inlets, may significantly increase the combustion rate of the starting and cooking fuels and thus significantly reduce the time required to start the cooking fuel for use to barbeque food. In FIGS. 2 and 6, air injection port 64 has been depicted as extending directly into the lower chamber, generally parallel to a horizontal surface upon which the igniter would be supported. It is within the scope of the present disclosure that other configurations and/or orientations may be utilized, including horizontal, radial, circular, upward, downward, etc. Illustrative, non-exclusive examples of other suitable air injection port configurations are shown in FIGS. 7-10.

FIG. 7 illustrates an example of an air injection port that is designed to deliver airflow 54 from air outlet 69 into the lower compartment to promote radial flow, or swirling, of the air within the lower chamber and then into the upper chamber. As illustrated, the air injection port 64 terminates at an end region 140 within lower chamber 42, with the end region extending at an angle from the air injection port. In other words, end region 140 is curved or bent away from an axial path defined by the air outlet, with this angle being selected to promote swirling of airflow 54 within at least the lower chamber. In FIG. 8, air injection port 64 terminates at an end region 140 that includes, or is positioned proximate, adjustable baffles 142. Baffles may be adjusted by a user to select the angle at which airflow 54 from air outlet 69 enters the lower chamber and/or to provide a surface against which the airflow passes to create turbulence. In FIG. 9, the air injection port terminates proximate a rotatable vane 144 that creates turbulence in the airflow as it enters the lower chamber from air outlet 69 and which prevents the airflow from entirely flowing directly into the starting fuel as it enters the lower chamber.

In some configurations, airflow to the lower chamber may be directed into flow patterns to enhance combustion, while in other configurations the air is simply released into the lower chamber, or air plenum. Enhanced patterns, though not exclusive, may involve a swirl pattern, a vertically directed flow, and a diffused flow. It is within the scope of the present disclosure that other flow patterns may also be employed. FIG. 10 provides an additional illustrative, non-exclusive example of another flow pattern that may be utilized by igniters within the scope of the present disclosure. As shown, air injection port 64 takes the form of a venturi injector 146. The injector includes a nozzle, or constricted outlet, 148 that injects air under pressure into an inlet cone 150 that is fluidly connected to an outlet cone 152 that extends into the lower chamber. The constriction of airflow 54 from the air propulsion source through the nozzle or outlet and then expansion of this airflow as it passes into outlet cone 152 causes air from external the igniter and which did not pass through inlet 56 of the air delivery mechanism to be drawn into the lower chamber through the inlet cone. Thus, the venturi injector increases the amount of air that is provided into the lower chamber per unit time compared to a comparable air delivery mechanism that does not include a venturi injector.

Similar to the other illustrative examples depicted in the other Figures, the features and structures that are described and/or illustrated with respect to FIG. 10 may be used separately, individually, or in other combinations with the structures and features described and/or illustrated with other igniters 10 depicted herein and/or incorporated herein. The same applies to subsequently described Figures.

In FIG. 10, another illustrative, non-exclusive example of an optional spark trap 26 is shown. As shown, spark trap 26 is pivotally coupled to the housing 30 of the igniter to obstruct outlet 18 by a coupling mechanism 28. In FIG. 10, the coupling mechanism takes the form of a pin or retainer 160 that couples the spark trap for selective rotation or other movement in a horizontal plane between open and closed positions, such as described above with other spark traps. It is also within the scope of the present disclosure that retainer 160 may be configured for repeated removal and replacement without destroying or damaging the pin, spark trap, or housing of the igniter to permit selective removal of the spark trap by a user.

FIG. 10 provides an illustrative example of another suitable configuration and structure for partition 44 for supporting cooking fuel above lower chamber 42. As shown, the partition has a cone-like configuration in which a central region 162 of the partition extends closer toward the outlet 18 of the igniter's internal compartment than a perimeter region 164 of the partition. This configuration may provide increased surface area than a planar partition 44. In the illustrated example, the partition is formed as a surface or sheet of air impermeable material through which spaced-apart openings 50 extend to permit air and other gases from the lower chamber to pass. It is also within the scope of the present disclosure that the illustrated configuration for partition 44 may be provided with a mesh partition or with other materials of construction.

In at least embodiments of igniters 10 that do not include an ignition device, it may be desirable for housing 30 to include an access port 170 through which a match, lighter, or similar flame source may be inserted into the lower compartment to ignite starting fuel contained therein. FIG. 10 provides an illustrative, non-exclusive example of such an access port 170. As illustrated, access port 170 includes an opening in housing 30 that extends into lower chamber 42. As illustrated, the access port is depicted on an opposite side of the lower chamber from air injection port 64. This configuration is not required, and in many embodiments that include an access port, it may be desirable to position the port closer to the air injection port so that actuation of the air delivery mechanism provides airflow 54 that initially fans the initial combustion of the starting fuel to propagate the flame though the starting fuel instead of retarding or otherwise inhibiting this propagation. FIG. 1 provides another illustrative example of a suitable position for an access port 170.

In FIGS. 1 and 10, igniters 10 include a deflectable closure 172 that is biased or otherwise configured to obstruct the access port at least when the air delivery mechanism is actuated. Closure 172 is not required when an igniter 10 includes access port 170. However, air delivery mechanism 70 is designed to positively provide an increased airflow to the lower chamber than would otherwise be present in the chamber if air was only able to enter the chamber through natural air flow from the environment external the igniter's internal compartment. Accordingly, openings in the lower chamber that permit this positive airflow from the air delivery mechanism to exit the lower chamber without passing to the upper chamber and out outlet 18 may reduce the beneficial effect of air delivery mechanism 70. The closures may be biased to a position in which the access port is obstructed by gravity or by a biasing structure, such as a spring, resilient member, or the like. The closures may, but are not required to, form a seal that prevents air from flowing through the inlet. In other embodiments, it may be sufficient for the closures to prevent a substantial portion of the air that would otherwise flow through the air inlet from flowing therethrough, such as at least 70%, 80%, 90%, 95%, or more.

As discussed, igniters 10 according to the present disclosure include a housing, or shell, 30 with an internal compartment 40 that includes fluidly connected lower and upper chambers 42 and 40, with an air-permeable partition 44 separating the upper and lower chambers. A starting fuel is positioned in the lower chamber, and a cooking fuel is positioned above the starting fuel in the upper chamber, such as on the partition. An air delivery mechanism 70, which may be an electrically powered air delivery mechanism, positively delivers an airflow 54 into the lower compartment through an inlet 16 in the form of an air injection port 64. Portions of the airflow and combustion exhaust exit the internal compartment through an outlet 18. The air delivery mechanism provides an increased flow rate of air per unit time than if air was merely permitted to flow naturally into the internal compartment from external the igniter. This increased flow rate of air promotes rapid combustion of the starting fuel and starting of the cooking fuel so that the cooking fuel is ready for use to barbeque food sooner than it would be if the air delivery mechanism was not utilized. In some embodiments, the cooking fuel may be ready at least 100%, 200%, 200-500%, 500%, 500-1000%, 700%, 1000-2000%, or more faster than if the air delivery mechanism was not utilized in the same igniter.

The significant increase in airflow may result in an igniter that is exposed to greater temperatures than if the air delivery mechanism was not utilized, and the rapid combustion of the fuels will consume, or utilize, the fuels faster than if the air delivery mechanism is not utilized. In some embodiments, it may be desirable to permit operation of the igniter without actuation of the air delivery mechanism, such as when such a rapid start time is not needed or desired. In some embodiments, it may be desirable to permit the combustion of the starting or cooking fuels to continue after the air delivery mechanism has been actuated for a time interval and then is no longer actuated. When such an embodiment is desired, igniter 10 may include at least one inlet 16 through which air is delivered to the lower chamber even though the air delivery mechanism is not actuated. This inlet 16 may include the inlet that forms the air injection port, such as when air may flow through the air conduit 68 of the air delivery mechanism when the air delivery mechanism is not actuated, but it is also within the scope of the present disclosure that igniters may additionally or alternatively include one or more additional inlets 16, and in some embodiments, selectively removable or openable closures for such air inlets.

When provided with such closures, the additional inlets 16 may be obstructed or otherwise closed during actuation of the air delivery mechanism so that the positively provided airflow 54 that is delivered into the lower chamber, which in such an embodiment may additionally or alternatively be described as an air plenum, at least a substantial portion, if not all, of the airflow and any combustion byproducts resulting therefrom must pass into the upper chamber and then exit the igniter's internal compartment through outlet 18. However, when it is desired to slow down the combustion, or starting, process, actuation of the air delivery mechanism may be stopped and/or the closures for the additional air inlets 16 may be opened or removed to permit air to pass through the inlets to support continued combustion of the remaining starting fuel and/or cooking fuel. When the air delivery mechanism is still actuated, these inlets may permit a portion of airflow 54 to pass therethrough, thereby reducing the amount of the airflow that passes through the partition to the cooking fuel. When the air delivery mechanism is not actuated, these inlets may permit air from external the igniter to flow naturally through the inlets to the lower chamber, and then through the partition to the upper chamber and out of the internal compartment through outlet 18 to support continued combustion of at least the cooking fuel, albeit at a slower rate than when the air delivery mechanism was actuated.

When an inlet 16 is utilized to provide forced air in the form of airflow 54 to the lower chamber, the inlet may be referred to as a forced-air inlet. When an inlet 16 is configured or otherwise utilized to permit air from external the igniter and which is not drawn into the lower chamber through air injection port 64 responsive to actuation of air delivery mechanism 70, the inlet may be referred to as a vent, as a natural-air inlet, and/or as a environmental-air inlet.

FIG. 1 schematically represents that in addition to an air inlet 16 through which air from air delivery mechanism 70 is positively provided, igniters 10 may include air inlets 16 in housing 30 and/or in bottom region 38. When present, these air inlets may include suitable closures to selectively obstruct the air inlets and/or to enable a user to adjust the portion of the inlet through which air may flow. Thus, it is within the scope of the present disclosure that a closure for an air inlet may provide either no obstruction or complete obstruction of the air inlet. It is also within the scope of the present disclosure that a closure may enable a user to select the degree to which the closure obstructs the air inlet, such as to include one or more configurations in which only a portion of the air inlet is obstructed.

FIG. 2 illustrates that bottom region 38 may include support 52 and may be a separate structure from housing 30. In such an embodiment, the bottom region may be designed to be selectively removed from the housing to permit air to flow through an air inlet in, or encircled by, the lower region of the housing. In such a configuration, the bottom region 38 may take the form of a base 38 that is an air-impermeable structure. When igniter 10 is placed upon a barbeque grill or other surface through which air may pass, removal of base 38 permits air to pass through the surface and into the lower chamber of the internal compartment. As an illustrative, non-exclusive example, after combustion of the starting fuel and partial, if not complete, starting of the cooking fuel, actuation of the air delivery mechanism may be stopped and base 38 may be removed to permit air to flow through the bottom of the internal compartment to promote continued, but slower, combustion of the cooking fuel. This process may be utilized, as an illustrative, non-exclusive example, when the cooking fuel is nearly or completely started and ready for use to barbeque food, but the user is not yet ready to do so. When bottom region 38 (and optionally support 52) is a separate structure from the housing of the igniter, it may be selectively coupled to the bottom of the housing by a coupling structure, such as a coupling structure 202, as schematically illustrated in FIG. 2. Alternatively, the bottom region 38 may be placed in contact with the bottom of the housing but not coupled thereto. Illustrative, non-exclusive examples of suitable coupling structures 202 include threaded closures, hinges, clips, frictional retainers, compressive bands, clasps, and the like.

FIG. 6 provides an example of a base 38 that forms a closure 200 for an air inlet 16 and which is coupled to housing 30 by a coupling structure 202 in the form of a hinge 204. FIG. 6 also provides a graphical example of an igniter 10 that includes a starting fuel support 52 that is a separate structure from bottom region, or base, 38. As shown, support 52 is positioned above bottom region 38 and in the illustrated example includes openings 51 through which air (from airflow 58 or otherwise from air external the internal compartment) may flow. In FIG. 10, bottom region 38 takes the form of a base and forms a closure 200 and is pivotally coupled to the housing of the igniter by a coupling mechanism 202 in the form of a hinge 204 and by a coupling mechanism 202 in the form of a releasable clasp 206. Clasp 206 may be a mechanical structure, and in some embodiments may be a magnetic structure. Also shown in FIG. 10 is an optional handle 208 that may be selectively grasped by a user to assist in repositioning of the bottom within a range of pivotal positions.

Figure 11:
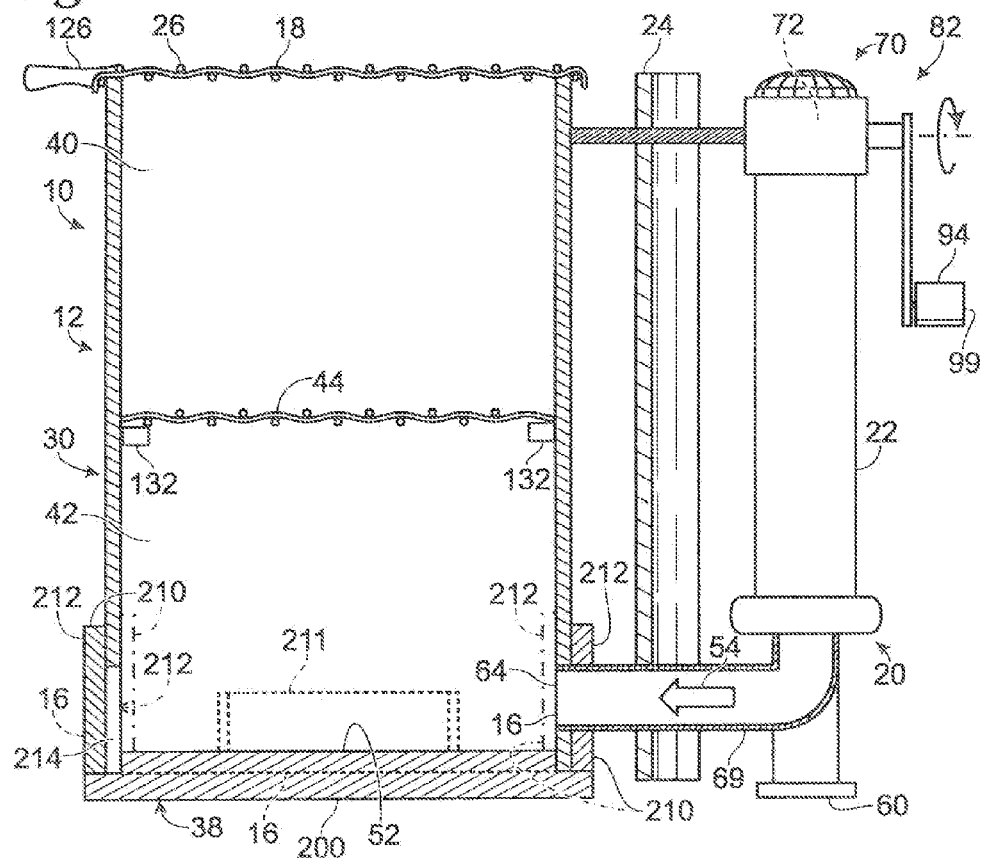
FIG. 11 is a partially schematic cross-sectional side elevation view of another igniter according to the present disclosure.

FIG. 11 provides another illustrative, non-exclusive example of an igniter 10 according to the present disclosure. For the purpose of brevity, previously discussed structures and features that are depicted in FIG. 11 are not discussed again. Furthermore, the additional features and structures that are discussed in connection with FIG. 11 may be utilized and/or implemented individually, collectively, or in other combinations in other igniters according to the present disclosure, and vice versa. In FIG. 11, bottom region 38 takes the form of a base 38 and includes support 52 for starting fuel. As indicated in dashed lines at 211 in FIG. 11, the base may also define a receptacle that constrains the starting fuel on the support. In the illustrated example, the base is a separate structure from the housing, or shell, 30 of the igniter. In FIG. 11, base 38 includes sidewalls 210 that extend along a lower region 212 of shell 30 of the igniter's body 12, and the lower region of the shell includes air inlets 16. The sidewalls may form a continuous or discontinuous structure that extends around all or a portion of the perimeter of the shell. The sidewalls may additionally or alternatively be referred to as a collar, or wall structure, 210. When the shell of the igniter is positioned on the base, the sidewalls may form closures 200 that obstruct the flow of air through openings 214 that otherwise would form air inlets 16 in the lower region of the shell. In FIG. 11, the sidewalls extend along the outer surface of shell 30. It is within the scope of the present disclosure that they may additionally or alternatively extend along the inner surface of the shell, as indicated in dash-dot lines in FIG. 11.

Figure 12:
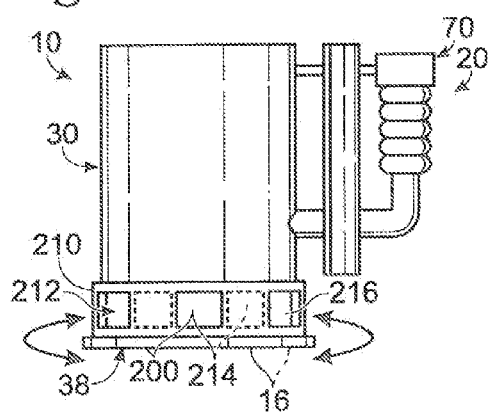
FIG. 12 is a side elevation view of another igniter according to the present disclosure.

When the sidewalls form spaced-apart segments and/or include openings therein, selective rotation or repositioning of the base relative to the shell of the igniter may permit a user to adjust the degree to which the sidewalls obstruct all, none, or a portion (some, but not all) of the air that would otherwise flow through air inlets 16 in lower region 212 from passing therethrough. FIG. 12 provides an illustrative, non-exclusive example of such a configuration, in which rotation of base 38 relative to the shell 30 of igniter 10 adjusts the degree to which air from external the igniter may flow into the igniter's lower chamber other than as provided by air delivery mechanism 70. As shown in FIG. 12, sidewalls, or collar, 210 project from base 38 and include spaced-apart openings 216 therein. Rotation of the base relative to shell 30 of igniter 10 enables a user to selectively align openings 216 with openings 214 in the lower portion 212 of the shell to provide and adjust the relative size of air inlets 16. When even more air is desired within lower region 212 other than through the actuation of air delivery mechanism 70, the base may be separated from the shell to provide an air inlet in the bottom of the internal chamber.

Figure 13:
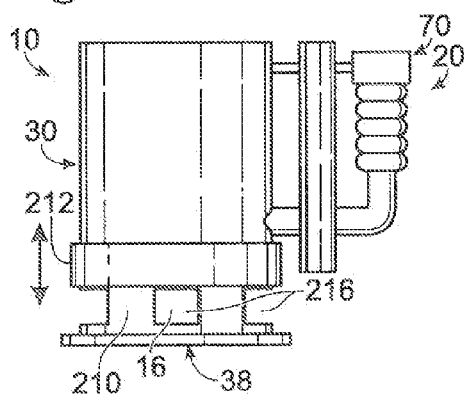
FIG. 13 is a side elevation view of another igniter according to the present disclosure.

FIG. 13 provides another illustrative example of an igniter with a base 38 that includes a collar 210 with spaced-apart openings 216. Similar to the example shown in FIG. 12, selective repositioning of the base relative to the shell 30 of the igniter permits adjustment of the extent to which air inlets 16 are formed between the collar and lower region 212 of the shell. In FIG. 12, the air inlets and their relative size are defined by a user rotating the base relative to the shell. In FIG. 13, the air inlets and their relative size are defined by selective vertical adjustment of the shell relative to the base. These relative paths of movement are indicated with double-headed arrows in FIGS. 12 and 13. In FIG. 13, one or more of the base and shell may include a retainer, or retention structure, that enables the shell to remain in a user-selected orientation relative to the base until additional user-imparted forces are applied to the shell or base to urge the shell and base to a different relative orientation.

FIGS. 14-17 provide additional illustrative, non-exclusive examples of igniters 10 with adjustable, and selectively closable, air inlets 16 to permit the passage of air into or out of lower chamber 42. In FIG. 14, shell 30 includes at least one door 220 that may be selectively opened or closed to define or obstruct an air inlet to the lower chamber of the igniter's internal compartment. FIG. 15 illustrates an igniter 10 in which shell 30 includes a plurality of projections 228, such as pins, rods, bolts, or the like, that are selectively positioned within a track 224 in supports 222 that extend from a bottom region, or base, 38. Track 224 includes at least one, if not several, detents 226 that selectively engage a projection 228 to define the relative position of the shell relative to bottom region, or base, 38 and thus which selectively define or obstruct air inlets 16. In the illustrated example, the track of each support 222 has a generally horizontal configuration, but other configurations may be used, including inclined, helical, and the like.

In FIG. 16, bottom region 38 includes at least one opening 230 that may be selectively aligned with an opening 232 in a moveable cover 234 to define an air inlet 16 therebetween. In the illustrated example, a plurality of openings 230 and 232 are shown, and cover 234 is coupled for rotational movement relative to the bottom region. It is within the scope of the present disclosure that other relative movement paths may be utilized, such as slidable or translating movement. The cover may extend internal or external the bottom region. An optional handle 236 is shown for a user to grasp to cause relative movement between the cover and bottom region. It is also within the scope of the present disclosure that a similar construction with a removable cover may additionally or alternatively be utilized on the vertical sidewall of shell 30.

In FIG. 17, shell 30 includes an air inlet 16 that forms the air injection port 64 through which the air delivery mechanism positively delivers the airflow to lower chamber 42 of the igniter's internal compartment. In the illustrative, non-exclusive example shown in FIG. 17, the shell further includes at least a second air conduit 240 extending from the lower chamber of the shell. The air conduit includes an inlet 242 that is not associated with the air delivery mechanism and through which air from external the igniter's internal compartment may flow. At 244, a closure mechanism is schematically illustrated. Closure mechanism 244 may be utilized by a user to selectively obstruct conduit 240, and in some embodiments to only partially obstruct the conduit, such as within a user-selected amount. Closure mechanism 244 may take any suitable form. Illustrative, non-exclusive examples of suitable closure mechanisms 244 include caps, valves, plugs, louvers, doors, vents, baffles, screens, flanges, clamps, and the like.

Returning briefly to FIG. 11, FIG. 11 also provides additional examples of optional structures and features that may be utilized and/or implemented in igniters 10 according to the present disclosure. For example, in dashed lines in FIG. 11, an illustrative example of an optional manual drive assembly 82 is shown. As illustrated, the manual drive assembly includes an actuator in the form of a handle 99 that a user grasps to manually rotate a crank or similar mechanism to generate airflow 54, such as by driving a manual compressor, fan, bellows, pump, or the like. Also shown in FIG. 11 is an example of a handle 20 that includes a support 60 projecting from the grip 22 of the handle. FIG. 11 also provides an example of a spark trap 26 that is not coupled directly to the shell of the igniter. Instead, the illustrated example of a spark trap is positioned across outlet 18, but the spark trap is not secured to the igniter. As depicted in FIG. 11, the spark trap also extends around a portion of the shell to frictionally retain the spark trap in a selected position, but this is not required. In FIG. 11, spark trap 26 extends in a generally planar configuration across outlet 18, but other configurations, such as concave and/or convex configurations may be utilized. Spark trap 26 is also shown in FIG. 11 including an optional spark trap handle 126 that projects from the portion of the spark trap that extends across outlet 18.

FIG. 18 provides a further illustrative, non-exclusive example for a spark trap 26. As shown, the spark trap includes a pair of spark trap members 250 and a biasing mechanism 252 that urges the spark trap members together to collectively extend across outlet 18. Also shown is a release, or actuator, 254 that a user selectively presses or otherwise actuates to urge the spark trap members against the force of biasing mechanism 252 to an open position through which objects may pass through outlet 18. Upon release of the actuator, the biasing mechanism may again draw the spark trap members together to extend across the opening to inhibit embers and other solid structures from passing therethrough.

As discussed previously, handle 20 is a suitable, but not exclusive, location for some or all of air delivery mechanism 70 of an igniter 10 according to the present disclosure. It is within the scope of the present disclosure that some or all of the air delivery mechanism may be housed in other portions of the igniter, attached to the igniter for movement as a unit with the rest of the igniter, or may be a separate structure that is selectively connected to the igniter when a user desires to use the igniter with the corresponding (portion of the) air delivery mechanism. FIGS. 19-21 provide illustrative, non-exclusive examples of igniters 10 according to the present disclosure in which at least a portion of the air delivery mechanism is not housed in handle 20. In FIGS. 19-21, igniters 10, including air delivery mechanism 70 and its components, have been schematically illustrated. It is within the scope of the present disclosure that the igniters depicted in FIGS. 19-21 may utilize and/or incorporate any of the features and structures described, illustrated, and/or incorporated herein.

As an illustrative, non-exclusive example, FIG. 19 depicts an igniter 10 in which handle 20 includes only a portion, but not all, of air delivery mechanism 70. Specifically, in FIG. 19, the handle includes at least air propulsion source 72, inlet 56, air conduit 68, and air injection port 64. However, it does not include at least a portion of the drive assembly 82 of the air delivery mechanism. Instead, at least a portion, if not all, of the drive assembly is a separate structure that is designed to be selectively and repeatedly connected to the portion of the air delivery mechanism in handle 20 when a user desires to use the air delivery mechanism to provide airflow 54. This separate structure is designed to be disconnected thereafter without damage to the air delivery mechanism or any other portion of the igniter. In some embodiments, the drive assembly may be a separate structure that is designed to be selectively coupled to air propulsion source 72 when it is desired to be able to actuate the air propulsion source. This illustrative embodiment may include both manually powered and electrically powered drive assemblies. In either embodiment, an output pinion or shaft of the drive assembly would be selectively coupled to the air propulsion source to drive the operation thereof. As a further illustrative example that is indicated in dash-dot lines in FIG. 19, a motor assembly for the air delivery mechanism may be housed in the handle with the air propulsion source, but energy source 86 may be a separate structure that is selectively connected, such as via a suitable wire structure or other electrical connector, to the motor assembly. In the above examples, and as indicated in dashed lines in FIG. 19, actuator 94 and/or controller 100, if present, may be positioned in any suitable location, such as with the air propulsion source or with the portion of the air delivery mechanism that is a separate structure that is selectively coupled to the air propulsion source.

FIG. 20 provides an example of an igniter 10 in which no portion of the air delivery mechanism is housed in handle 20. Instead, the air delivery mechanism is a separate structure, such as which may include its own housing 300. As discussed previously, the air delivery mechanism still includes an air propulsion source, a drive assembly, an actuator, and an optional controller. The air delivery mechanism includes an air inlet 56 through which air from external the housing 300 is drawn into the housing and positively forced through air conduit 68 to an outlet 69. Outlet 69 is configured to establish fluid communication, and optionally a seal, with air injection port 64 to deliver the airflow to the lower chamber of the igniter. In FIG. 20, a coupling structure 302 is schematically indicated to graphically represent that any suitable structure may be used to releasably connect the air outlet to the air injection port. While a fluid impermeable seal may be desirable to prevent some of airflow 54 from not being delivered to lower compartment, such as by flowing from outlet 69 to the environment around igniter 10 instead of through air injection port 64, it is not required to all embodiments. An illustrative, non-exclusive example of a suitable coupling structure 302 is a frictional connection between male and female fluid connectors, such as with outlet 69 being inserted at least partially into air injection port 64.

FIG. 21 provides another illustrative, non-exclusive example of an air delivery mechanism 70 that is a separate structure from the rest of the igniter. As shown, air delivery mechanism 70 includes its own housing 300, similar to the example of FIG. 20. However, in FIG. 21, housing 300 includes at least one inlet 56 for air to be drawn into the air delivery mechanism's air conduit, and an air outlet 69 that is positioned within a support, or seat, 310 upon which the igniter may be positioned. In the illustrated example, air injection port 64 is on the bottom region 38 of the igniter's body. When igniter 10 is used without air delivery mechanism 70, the igniter may be placed on a barbeque grill or other air-permeable surface so that air to support combustion of the starting and cooking fuels may be drawn through the bottom region of the igniter's body. When a user wants to use the igniter with the air delivery mechanism, the body of the igniter may be placed upon seat 310 of the air delivery mechanism's housing so that airflow 54 produced during actuation of the air delivery mechanism's air propulsion source 72 is delivered to port 64. As also indicated schematically in FIG. 21, housing 300 may also contain or include the air delivery mechanism's drive assembly 82, actuator 94, and controller 100 (when present).

In some embodiments, igniters 10 according to the present disclosure may be used without a solid starting fuel. For example, a liquid or gaseous starting fuel may be utilized. As an illustrative example of the above, a receptacle, such as indicated at 211 in FIG. 11, may be utilized to hold a quantity of a liquid starting fuel, such as a combustible liquid hydrocarbon or alcohol. As a further example, the handle or another portion of the igniter may contain a canister of compressed combustible gas that is selectively dispensed and combusted to initiate combustion of the cooking fuel. As a further example, a portion of the cooking fuel may be initially ignited by any suitable mechanism prior to placing at least that portion of the cooking fuel in the upper chamber and/or at least prior to actuating the air delivery mechanism. In this latter embodiment, the igniter may be utilized without a starting fuel that is positioned in the lower chamber.

FIGS. 22 and 23 provide illustrative, non-exclusive examples of additional igniters 10 according to the present disclosure. Igniters 10 provide examples of thermally powered solid fuel igniters. Such igniters may additionally or alternatively be referred to as including a thermally assisted air delivery mechanism and/or a thermally driven air delivery mechanism. As shown, the igniters 10 of FIGS. 22 and 23 include a body 12 with a shell, or housing, 30, a lower chamber 42 with at least one air inlet 16, an air-permeable partition 44 positioned to support a cooking fuel in an upper chamber 40, and an outlet 18 through which air from the lower chamber and combustion exhaust gases may exit the internal compartment 14 of the igniter. It is within the scope of the present disclosure that the igniters of FIGS. 22 and 23 may, but are not required to, include any of the features or components described, illustrated, and/or incorporated herein in connection with other igniters according to the present disclosure.

Each of the examples of the thermally powered solid fuel igniters shown in FIGS. 22 and 23 includes an air propulsion source 72 that is adapted to generate a forced-air flow, such as airflow 54 responsive to actuation of the air propulsion source by drive assembly 82. Air propulsion source 72 may have any suitable structure, shape, and/or configuration that is configured to generate a flow of air to increase the flow rate, or amount per unit of time, of air that is delivered to at least the cooking fuel compared to a corresponding igniter in which air was only available through natural draft mechanisms. In FIGS. 22 and 23, the air propulsion source is adapted to generate this airflow responsive to receipt of a mechanical input from drive assembly 82, such as a rotational input or a reciprocating translational input. In FIGS. 22 and 23, air propulsion source 72 takes the form of a rotatable member 402, such as a fan or turbine with blades, or vanes, 404 that generate airflow 54 upon actuation of the air propulsion source.

In FIGS. 22 and 23, the air propulsion source is actuated, or in the illustrated embodiments, rotationally driven, by the output of a drive assembly 82 that is configured to be powered by heated air and combustion exhaust gases from the fuel(s) in the igniter's internal compartment. Specifically, and as indicated in at least FIG. 22, drive assembly 82 includes a rotatable drive member 410 with vanes, or other suitable air-engaging contact surfaces 412, that are positioned to be contacted by heated air and other gases flowing through the internal compartment toward outlet 18. This flow of heated air and combustion exhaust gases, which is indicated at 420 in FIG. 22, causes, or propels, the rotation of rotatable drive member 410, which is mechanically coupled by a drive linkage 422 to air propulsion source 72 to actuate the generation of airflow 54 by the air propulsion source. In the illustrative example, drive linkage 422 takes the form of an axle, or drive shaft, 424. Rotatable member 402 and rotatable drive member 410 may be coupled or otherwise connected to the axle or other drive linkage by any suitable mechanism, including being secured thereto for rotation as a collective unit, such that rotation of rotatable drive member results in relative, if not corresponding, rotation of the drive member or other air propulsion source. It is within the scope of the present disclosure that other drive linkages may be utilized, including drive linkages that include two or more members, bushings, gears, bearings, and the like, as well as drive linkages that extend partially or complete outside of the internal compartment or shell of the igniter's body. The air delivery mechanism is designed to begin producing airflow 54 responsive to rotation of the air propulsion source by the drive assembly, with the actuator for this process being the lighting, or initiating of combustion, of the starting fuel.

In FIG. 22, igniter 10 includes an air-permeable partition 44 that is positioned and designed to support a quantity of solid cooking fuel such that airflow 54 from the air propulsion source flows around and/or through the cooking fuel to prepare the cooking fuel for use to barbeque food. In FIG. 22, the igniter also includes an optional air-permeable support 52 for a solid starting fuel, with support 52 being positioned to support the starting fuel beneath the cooking fuel. In such a configuration, the starting fuel may be described as being supported in a lower chamber 42 beneath an upper chamber 40 containing the cooking fuel. As illustrated, drive linkage 422 extends through at least portions of the upper and lower chambers, but this too is not required to all embodiments. As discussed previously, it is within the scope of the present disclosure that the igniter may be operated without a starting fuel and/or without support 52. Similarly, it is within the scope of the present disclosure that support 52, partition 44, air delivery mechanism 70, and/or portions or components thereof are designed to be repeatedly removed and replaced from the body of the igniter, such as to permit access to the chambers, to add fuel thereto, to remove spent fuel and/or debris or ash therefrom, for cleaning or maintenance, and the like. It is additionally or alternatively within the scope of the present disclosure that the body of the igniter may include one or more access ports for performing one or more of the above actions.

In FIGS. 23 and 24, additional illustrative, non-exclusive examples of air delivery mechanisms for thermally powered igniters according to the present disclosure are shown. FIG. 23 illustrates the igniter 10, and FIG. 24 illustrates the air delivery mechanism 70 of FIG. 23 along with optional components that may be coupled for removal and/or insertion as a unit with the air delivery mechanism into the internal compartment of the igniter. In FIG. 23, body 12 of the igniter is shown with a bottom region 38, which may include one or more air inlets 16. As illustrated, the bottom region includes one or more feet, or ribs, 440 that support the igniter upon a surface to define a flow path of air to enter the internal compartment through one or more air inlets 16. FIG. 23 also illustrates that the air delivery mechanism may include an optional handle 442 with a grip 444 that projects from the internal compartment 14 of the igniter to facilitate a user removing the air propulsion mechanism, and optionally support 52, partition 44, and/or any fuel, ashes, or other objects contained in the internal compartment, from the internal compartment. Similarly, the handle may be used to insert the air delivery mechanism, and optionally an attached support 52 and/or partition 44, back into the internal compartment. FIG. 23 also graphically depicts that it is within the scope of the present disclosure that an igniter 10 may be formed without a partition that separates the lower and upper chambers. FIG. 23 also discloses that an igniter may include one or more optional stops 446 that are positioned within internal compartment 14 to support and/or position support 52, partition 44, and/or air delivery mechanism 70 within the internal compartment. As indicated in dashed lines at 448, the igniter's body may include a plurality of interconnected members that collectively define the internal compartment and which may be selectively coupled or uncoupled by engaging or disengaging any suitable coupling mechanisms 450. Coupling mechanisms 450 may have any suitable configuration, with illustrative, non-exclusive examples including threaded fittings and frictional retainers.

INDUSTRIAL APPLICABILITY

The starting devices, systems, and methods according to the present disclosure are applicable to at least the barbequing and outdoor products industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. An igniter for solid cooking fuels, the igniter comprising a body, comprising:
  a shell that defines an internal compartment having at least one inlet and an outlet, wherein the internal compartment includes a lower chamber, wherein the at least one inlet includes at least a forced-air inlet, which is adapted to deliver a positive forced airflow to the lower chamber, and further wherein the lower chamber is adapted to receive a quantity of a combustible starting fuel, and further wherein the internal compartment is configured to receive a quantity of a solid cooking fuel above the quantity of the combustible starting fuel; and
  a handle extending from the shell, including a primary air inlet, and defining an air conduit that extends from the primary air inlet to the forced-air inlet of the lower chamber, the handle comprising:

a hand grip sized to be grasped in a user's hand for moving the igniter; and at least one linkage interconnecting the hand grip with the shell, wherein the at least one linkage includes a hollow linkage that establishes fluid communication with the forced-air inlet of the lower chamber, and further wherein the air conduit extends from the primary air inlet, through the hand grip to the hollow linkage, and from the hollow linkage to the forced-air inlet of the lower chamber; and an air delivery mechanism that, when actuated, provides the positive forced airflow through the hollow linkage to the lower chamber to promote combustion of the starting fuel and the cooking fuel, wherein the provision of the positive forced airflow by the air delivery mechanism results in air flowing through the hand grip to cool the hand grip, and further wherein the air delivery mechanism is at least substantially housed in the handle, and further wherein the air delivery mechanism comprises:

an air propulsion source adapted to generate the positive forced airflow from air external the igniter and to deliver the positive airflow through the hollow linkage to the lower chamber through the forced-air inlet;

a drive assembly adapted to selectively power the air propulsion source to generate the positive forced airflow; and an actuator adapted to initiate actuation of the air propulsion source by the drive assembly responsive to receipt of a user input.

2. The igniter of claim 1, wherein the air propulsion source and the drive assembly of the air delivery mechanism are at least substantially housed in the handle and cooled by air flowing through the air conduit when the air delivery mechanism is actuated.

3. The igniter of claim 2, wherein the air delivery mechanism, when actuated, is further configured to restrict flow of heated air from the shell to the portion of the air delivery mechanism that is housed in the handle.

4. The igniter of claim 3, wherein the igniter further includes a heat shield that is positioned in a spaced-apart relationship between the shell and the handle and which is configured to reduce the transmission of heat radiating from the shell to the handle.

5. The igniter of claim 1, wherein the drive assembly includes at least one motor and at least one battery adapted to power the at least one motor.

6. The igniter of claim 1, wherein the air delivery mechanism further includes a timer adapted to automatically interrupt actuation of the air delivery mechanism after a predetermined time period elapses after actuation of the air delivery mechanism by the actuator.

7. The igniter of claim 1, wherein upon actuation by the user input, the air delivery mechanism is configured to prepare the cooking fuel, in less than five minutes at sea level, to emit sufficient heat for barbequing food.

8. The igniter of claim 1, wherein the air delivery mechanism includes a controller adapted to automatically regulate operation of the air delivery mechanism.

9. The igniter of claim 8, wherein the igniter includes a tip switch adapted to detect if the igniter is inclined by more than a predetermined angle from a vertical orientation, and further wherein the controller is adapted to automatically restrict actuation of the air delivery mechanism responsive to an input from the tip switch indicating that the igniter is inclined by more than the predetermined angle.

10. The igniter of claim 8, wherein the igniter further comprises a spark trap that is selectively configured between a closed position, in which the spark trap extends across the outlet to restrict embers and the cooking fuel from passing through the outlet, and an open position, in which embers and the cooking fuel may pass through the outlet, wherein the igniter further includes a spark trap closure sensor adapted to detect if the spark trap is in the closed position, and further wherein the controller is adapted to automatically restrict actuation of the air delivery mechanism responsive to an input from the spark trap closure sensor indicating that the spark trap is not in the closed position.

11. The igniter of claim 8, wherein the igniter further includes a temperature sensor, and further wherein the controller is adapted to automatically interrupt actuation of the air delivery mechanism responsive to an input from the temperature sensor detecting a temperature that exceeds a threshold temperature.

12. The igniter of claim 8, wherein upon actuation by the user input, the controller is adapted to automatically control operation of the air delivery mechanism to prepare the cooking fuel, in less than five minutes at sea level, to emit sufficient heat for barbequing food.

13. The igniter of claim 1, wherein the shell further includes an environmental-air inlet that is adapted to permit air from external the igniter to flow into the lower chamber other than as part of the positive forced airflow.

14. The igniter of claim 13, wherein the environmental-air inlet is in fluid communication with the hollow linkage and is adapted to receive air from external the igniter through the hollow linkage, and further wherein the body further comprises a closure that is configured to selectively obstruct at least a substantial portion of the environmental-air inlet.

15. The igniter of claim 14, wherein the closure is configured for movement relative to the shell between a closed position, in which the closure at least substantially obstructs air from flowing through the environmental-air inlet, and an open position, in which the closure does not at least substantially obstruct air from flowing through the environmental-air inlet.

16. The igniter of claim 15, wherein the closure is pivotally coupled to the shell.

17. The igniter of claim 1, wherein the igniter further includes an electric ignition device that is adapted to electrically initiate combustion of the combustible starting fuel in the lower chamber.

18. The igniter of claim 1, wherein the hollow linkage is in fluid communication with an air injection port that delivers the positive forced airflow into the lower chamber, and further wherein the air injection port is configured to promote radial flow of the positive forced airflow within the lower chamber.

19. The igniter of claim 18, wherein the air injection port includes an end region that extends within the lower chamber and which extends at an inclined angle away from an axial path defined by the hollow linkage.

20. The igniter of claim 1, wherein the hollow linkage is in fluid communication with an air injection port that delivers the positive forced airflow into the lower chamber, and further wherein the lower chamber includes at least one baffle or rotatable vane that is positioned proximate the air injection port to receive and redirect the positive forced airflow within the lower chamber.

21. The igniter of claim 1, wherein the primary air inlet is positioned closer to the outlet of the internal compartment than the hollow linkage, wherein the primary air inlet and the hollow linkage are separated by the hand grip, and wherein the hollow linkage maintains a fixed structural connection between the hand grip and the shell.

22. The igniter of claim 1, further comprising an air-permeable partition that separates the internal compartment into the lower chamber and an upper chamber that is fluidly connected with the lower chamber, wherein the partition is adapted to support the quantity of the solid cooking fuel within the upper chamber.

23. The igniter of claim 22, wherein the partition is pivotally coupled to the shell and is selectively pivoted between at least a fuel-supporting position, in which the partition extends across at least a substantial portion of the internal compartment to provide a support for cooking fuel in the upper chamber, and a retracted position, in which the partition is pivoted away from the fuel-supporting position to provide access to the lower chamber for the insertion or removal of starting fuel relative to the lower chamber.

24. An igniter for solid cooking fuels, the igniter comprising:
  a body, comprising:
    a shell that defines an internal compartment having at least one inlet and an outlet, wherein the internal compartment includes a lower chamber, wherein the at least one inlet includes at least a forced-air inlet, which is adapted to deliver a positive forced airflow to the lower chamber, further wherein the lower chamber is adapted to receive a quantity of a combustible starting fuel, and further wherein the internal compartment is configured to receive a quantity of a solid cooking fuel above the quantity of the combustible starting fuel; and
    a handle extending from the shell, the handle comprising:
      a grip sized to be grasped in a user's hand for moving the igniter; and
      at least one linkage interconnecting the grip with the shell, wherein the at least one linkage includes a hollow linkage that establishes fluid communication with the forced-air inlet of the lower chamber;
  a tip switch adapted to detect if the igniter is inclined by more than a predetermined angle from a vertical orientation; and
  an air delivery mechanism that, when actuated, provides the positive forced airflow through the hollow linkage to the lower chamber to promote combustion of the starting fuel and the cooking fuel, wherein the air delivery mechanism is at least substantially housed in the handle, and further wherein the air delivery mechanism comprises:
    an air propulsion source adapted to generate the positive forced airflow from air external the igniter and to deliver the positive airflow through the hollow linkage to the lower chamber through the forced-air inlet;
    a drive assembly adapted to selectively power the air propulsion source to generate the positive forced airflow;
    a controller adapted to automatically restrict actuation of the air delivery mechanism responsive to an input from the tip switch indicating that the igniter is inclined by more than the predetermined angle; and
    an actuator adapted to initiate actuation of the air propulsion source by the drive assembly responsive to receipt of a user input.

25. The igniter of claim 24, further comprising an air-permeable partition that separates the internal compartment into the lower chamber and an upper chamber that is fluidly connected with the lower chamber, wherein the partition is adapted to support the quantity of the solid cooking fuel within the upper chamber.

26. An igniter for solid cooking fuels, the igniter comprising:
  a body, comprising:
    a shell that defines an internal compartment having at least one inlet and an outlet, wherein the internal compartment includes a lower chamber, wherein the at least one inlet includes at least a forced-air inlet, which is adapted to deliver a positive forced airflow to the lower chamber, further wherein the lower chamber is adapted to receive a quantity of a combustible starting fuel, and further wherein the internal compartment is configured to receive a quantity of a solid cooking fuel above the quantity of the combustible starting fuel; and
    a handle extending from the shell, the handle comprising:
      a grip sized to be grasped in a user's hand for moving the igniter; and
      at least one linkage interconnecting the grip with the shell, wherein the at least one linkage includes a hollow linkage that establishes fluid communication with the forced-air inlet of the lower chamber; and
    a spark trap that is selectively configured between a closed position, in which the spark trap extends across the outlet to restrict embers and the cooking fuel from passing through the outlet, and an open position, in which embers and the cooking fuel may pass through the outlet;
  a spark trap closure sensor adapted to detect if the spark trap is in the closed position; and
  an air delivery mechanism that, when actuated, provides the positive forced airflow through the hollow linkage to the lower chamber to promote combustion of the starting fuel and the cooking fuel, wherein the air delivery mechanism is at least substantially housed in the handle, and further wherein the air delivery mechanism comprises:
    an air propulsion source adapted to generate the positive forced airflow from air external the igniter and to deliver the positive airflow through the hollow linkage to the lower chamber through the forced-air inlet;
    a drive assembly adapted to selectively power the air propulsion source to generate the positive forced airflow;
    a controller adapted to automatically restrict actuation of the air delivery mechanism responsive to an input from the spark trap closure sensor indicating that the spark trap is not in the closed position; and
    an actuator adapted to initiate actuation of the air propulsion source by the drive assembly responsive to receipt of a user input.

27. The igniter of claim 26, further comprising an air-permeable partition that separates the internal compartment into the lower chamber and an upper chamber that is fluidly connected with the lower chamber, wherein the partition is adapted to support the quantity of the solid cooking fuel within the upper chamber.

28. An igniter for solid cooking fuels, the igniter comprising
  a body, comprising:
    a shell that defines an internal compartment having at least one inlet and an outlet, wherein the internal compartment includes a lower chamber, wherein the at least one inlet includes at least a forced-air inlet, which is adapted to deliver a positive forced airflow to the lower chamber, further wherein the lower chamber is adapted to receive a quantity of a combustible starting fuel, and further wherein the internal compartment is configured to receive a quantity of a solid cooking fuel above the quantity of the combustible starting fuel; and a handle extending from the shell, including an air inlet, and defining an air conduit that extends from the air inlet to the forced-air inlet of the lower chamber, the handle comprising:
  a hand grip sized to be grasped in a user's hand for moving the igniter; and
  at least one linkage interconnecting the hand grip with the shell, wherein the at least one linkage includes a hollow linkage that establishes fluid communication with the forced-air inlet of the lower chamber, and further wherein the air conduit extends from the air inlet, through the hand grip to the hollow linkage, and from the hollow linkage to the forced-air inlet of the lower chamber; and an air delivery mechanism that, when actuated, provides the positive forced airflow through the hollow linkage to the lower chamber to promote combustion of the starting fuel and the cooking fuel, wherein the provision of the positive forced airflow by the air delivery mechanism results in air flowing through the air conduit to cool the hand grip, and further wherein the air delivery mechanism is at least substantially housed in the handle, and further wherein the air delivery mechanism comprises:
  an air propulsion source adapted to generate the positive forced airflow from air external the igniter and to deliver the positive airflow through the hollow linkage to the lower chamber through the forced-air inlet; wherein the hollow linkage is in fluid communication with an air injection port that delivers the positive forced airflow into the lower chamber, and further wherein the air injection port is configured to promote radial flow of the positive forced airflow within the lower chamber;
  a drive assembly adapted to selectively power the air propulsion source to generate the positive forced airflow; and
  an actuator adapted to initiate actuation of the air propulsion source by the drive assembly responsive to receipt of a user input.

29. The igniter of claim 28, further comprising an air-permeable partition that separates the internal compartment into the lower chamber and an upper chamber that is fluidly connected with the lower chamber, wherein the partition is adapted to support the quantity of the solid cooking fuel within the upper chamber.

30. The igniter of claim 28, wherein the air injection port includes an end region that extends within the lower chamber and which extends at an inclined angle away from an axial path defined by the hollow linkage.

31. The igniter of claim 28, wherein the drive assembly includes at least one motor and at least one battery adapted to power the at least one motor; and further wherein the air propulsion source and the drive assembly of the air delivery mechanism are at least substantially housed in the handle and cooled by air flowing through the air conduit when the air delivery mechanism is actuated.

32. The igniter of claim 28, wherein the air inlet is positioned closer to the outlet of the internal compartment than the hollow linkage, and further wherein the air inlet and the hollow linkage are separated by the hand grip.

33. An igniter for solid cooking fuels, the igniter comprising
a body, comprising:
  a shell that defines an internal compartment having at least one inlet and an outlet, wherein the internal compartment includes a lower chamber, wherein the at least one inlet includes at least a forced-air inlet, which is adapted to deliver a positive forced airflow to the lower chamber, further wherein the lower chamber is adapted to receive a quantity of a combustible starting fuel, and further wherein the internal compartment is configured to receive a quantity of a solid cooking fuel above the quantity of the combustible starting fuel;
  a handle extending from the shell, including an air inlet, and defining an air conduit that extends from the air inlet to the forced-air inlet of the lower chamber, the handle comprising:
    a hand grip sized to be grasped in a user's hand for moving the igniter; and
    at least one linkage interconnecting the hand grip with the shell, wherein the at least one linkage includes a hollow linkage that establishes fluid communication with the forced-air inlet of the lower chamber, and further wherein the air conduit extends from the air inlet, through the hand grip to the hollow linkage, and from the hollow linkage to the forced-air inlet of the lower chamber; and
  an air delivery mechanism that, when actuated, provides the positive forced airflow through the hollow linkage to the lower chamber to promote combustion of the starting fuel and the cooking fuel, wherein the provision of the positive forced airflow by the air delivery mechanism results in air flowing through the air conduit to cool the hand grip, and further wherein the air delivery mechanism is at least substantially housed in the handle, and further wherein the air delivery mechanism comprises:
    an air propulsion source adapted to generate the positive forced airflow from air external the igniter and to deliver the positive forced airflow through the hollow linkage to the lower chamber through the forced-air inlet; wherein the hollow linkage is in fluid communication with an air injection port that delivers the positive forced airflow into the lower chamber, and further wherein the lower chamber includes at least one baffle or rotatable vane that is positioned proximate the air injection port to receive and redirect the positive forced airflow within the lower chamber;
    a drive assembly adapted to selectively power the air propulsion source to generate the positive forced airflow; and
    an actuator adapted to initiate actuation of the air propulsion source by the drive assembly responsive to receipt of a user input.

34. The igniter of claim 33, further comprising an air-permeable partition that separates the internal compartment into the lower chamber and an upper chamber that is fluidly connected with the lower chamber, wherein the partition is adapted to support the quantity of the solid cooking fuel within the upper chamber.

35. The igniter of claim 33, wherein the drive assembly includes at least one motor and at least one battery adapted to power the at least one motor; and further wherein the air propulsion source and the drive assembly of the air delivery mechanism are at least substantially housed in the handle and cooled by air flowing through the air conduit when the air delivery mechanism is actuated.

36. The igniter of claim 33, wherein the air inlet is positioned closer to the outlet of the internal compartment than the hollow linkage, and further wherein the air inlet and the hollow linkage are separated by the hand grip.

* * * * *